(12) United States Patent
Mizoshita et al.

(10) Patent No.: US 11,158,493 B2
(45) Date of Patent: Oct. 26, 2021

(54) ORGANIC SILICA THIN FILM, METHOD FOR PRODUCING THE SAME, LASER DESORPTION/IONIZATION MASS SPECTROMETRIC SUBSTRATE USING THE SAME, AND LASER DESORPTION/IONIZATION MASS SPECTROMETRIC METHOD

(71) Applicant: KABUSHIKI KAISHA TOYOTA CHUO KENKYUSHO, Nagakute (JP)

(72) Inventors: Norihiro Mizoshita, Nagakute (JP); Yuri Sasaki, Nagakute (JP); Yasutomo Goto, Nagakute (JP); Shinji Inagaki, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 0 days.

(21) Appl. No.: 16/968,838

(22) PCT Filed: Mar. 19, 2019

(86) PCT No.: PCT/JP2019/011561
§ 371 (c)(1),
(2) Date: Aug. 10, 2020

(87) PCT Pub. No.: WO2019/181970
PCT Pub. Date: Sep. 26, 2019

(65) Prior Publication Data
US 2021/0028000 A1  Jan. 28, 2021

(30) Foreign Application Priority Data
Mar. 22, 2018 (JP) .............................. JP2018-054874

(51) Int. Cl.
*H01J 49/04*  (2006.01)
*B01J 20/22*  (2006.01)
(Continued)

(52) U.S. Cl.
CPC .......... *H01J 49/0418* (2013.01); *B01J 20/22* (2013.01); *B01J 20/3425* (2013.01);
(Continued)

(58) Field of Classification Search
CPC .. H01J 49/0418; H01J 49/0031; H01J 49/164; B01J 20/22; B01J 20/3425; B01J 20/3441
See application file for complete search history.

(56) References Cited

U.S. PATENT DOCUMENTS

| | | |
|---|---|---|
| 6,958,480 B1 | 10/2005 | Iyer et al. |
| 2010/0323917 A1 | 12/2010 | Vertes et al. |

FOREIGN PATENT DOCUMENTS

| | | |
|---|---|---|
| JP | 2013080201 A | 5/2013 |
| JP | 2014115187 A | 6/2014 |

(Continued)

OTHER PUBLICATIONS

Jul. 10, 2019 Written Opinion of the International Searching Authority issued in International Patent Application No. PCT/JP2019/011561.

(Continued)

*Primary Examiner* — Nicole M Ippolito
*Assistant Examiner* — Hanway Chang
(74) *Attorney, Agent, or Firm* — Oliff PLC

(57) ABSTRACT

An organic silica thin film including: organic silica having a light absorbable organic group in a skeleton, wherein the organic group has a local maximum absorption wavelength in a wavelength range of 200 to 1200 nm, a content ratio of silicon and the organic group which constitute the organic silica is in a range of 0.05 to 0.50 based on a ratio of a mass of the silicon to a mass of the organic group ([mass of the silicon]/[mass of the organic group]), the thin film has a textured structure, and an axis direction of the textured structure is a direction substantially perpendicular to a (Continued)

surface opposite to a surface of the organic silica thin film having the textured structure formed therein.

13 Claims, 6 Drawing Sheets

(51) Int. Cl.
*B01J 20/34* (2006.01)
*H01J 49/00* (2006.01)
*H01J 49/16* (2006.01)

(52) U.S. Cl.
CPC ....... *B01J 20/3441* (2013.01); *H01J 49/0031* (2013.01); *H01J 49/164* (2013.01)

(56) References Cited

FOREIGN PATENT DOCUMENTS

KR 101 592 517 B1 2/2016
WO 02/093170 A1 11/2002

OTHER PUBLICATIONS

May 26, 2020 Office Action issued in Japanese Patent Application No. 2018-054874.
Jul. 10, 2019 International Search Report issued in International Patent Application No. PCT/JP2019/011561.

[Fig. 1]
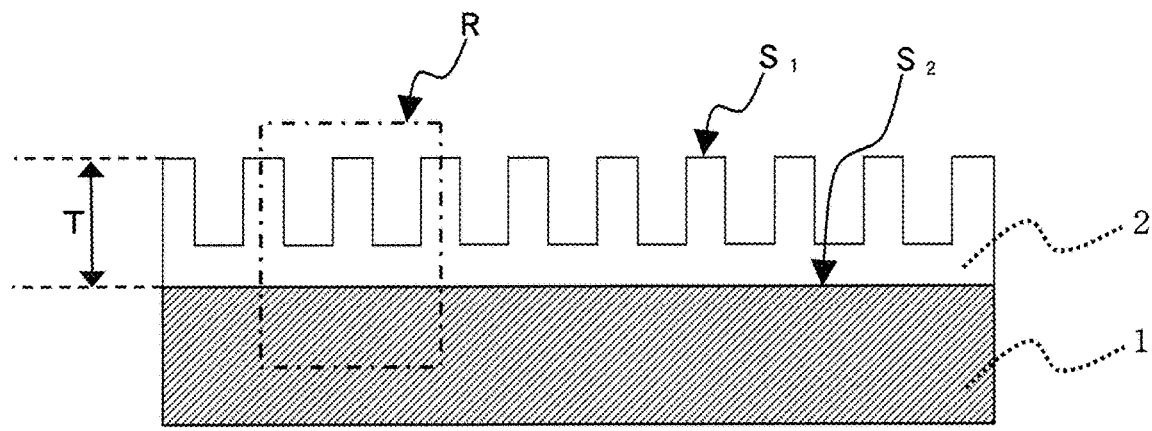
[Fig. 2]
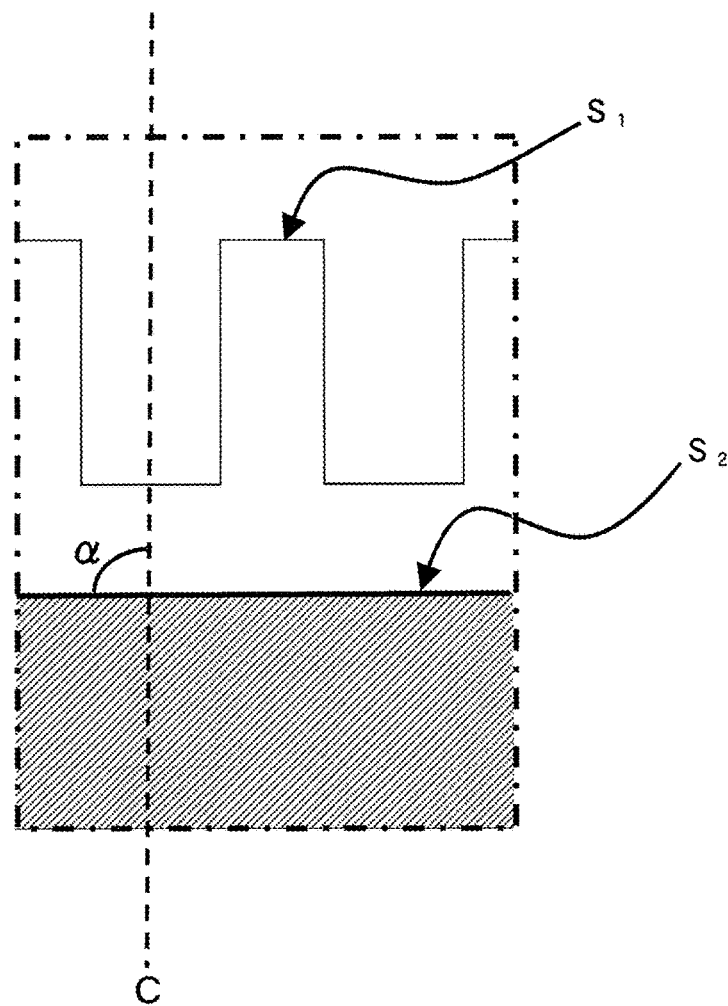

[Fig. 3]
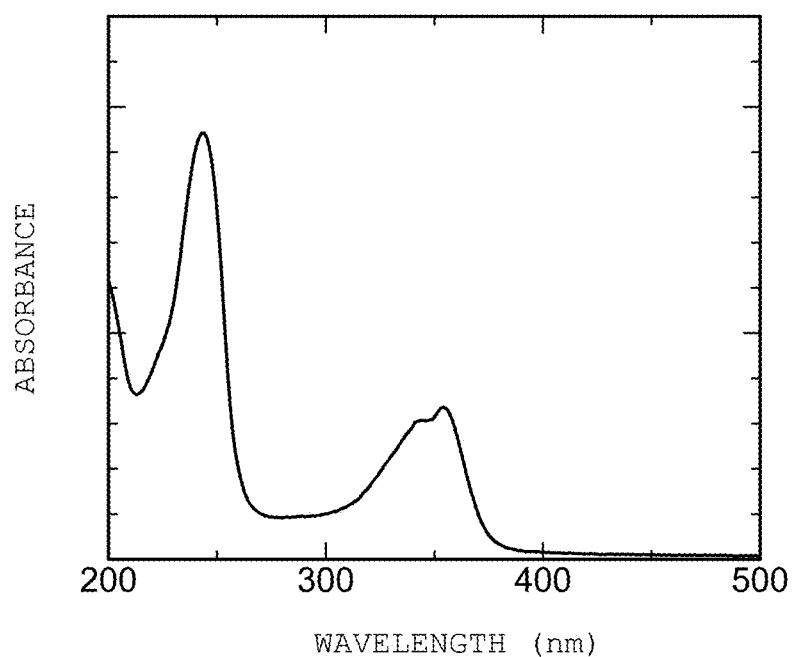
[Fig. 4]
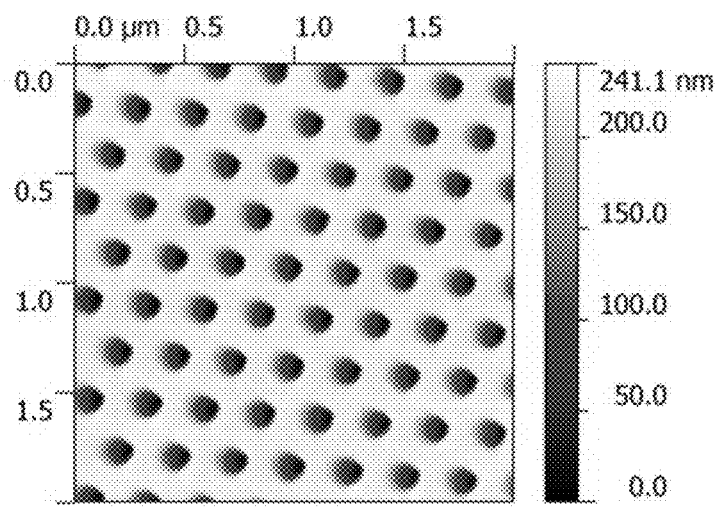

[Fig. 5]
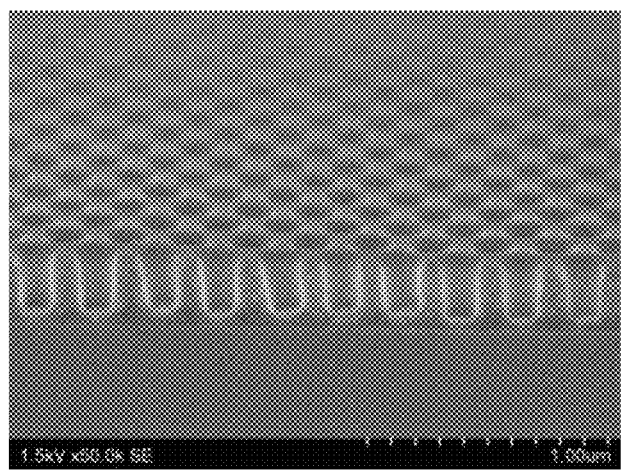
[Fig. 6]
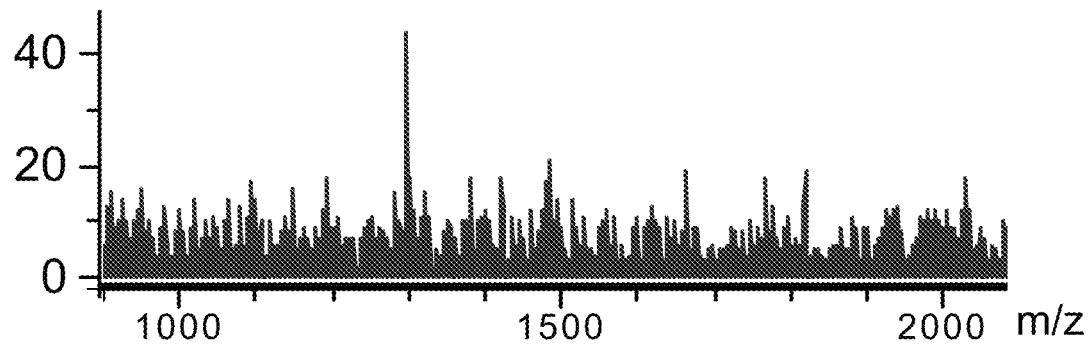
[Fig. 7]
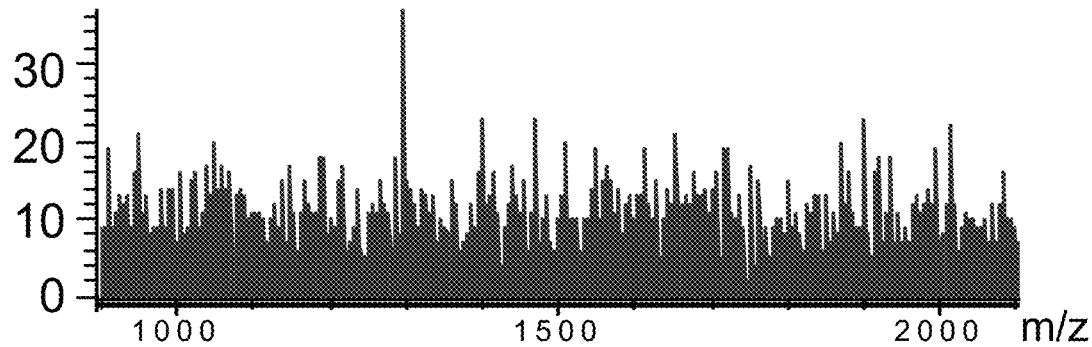

[Fig. 8]
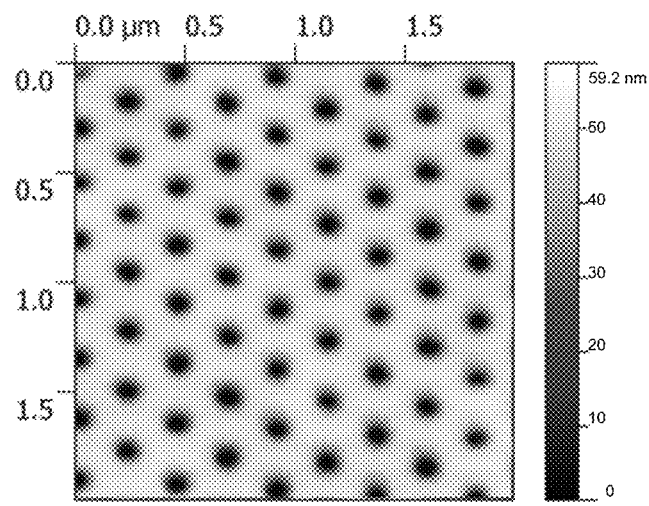
[Fig. 9]
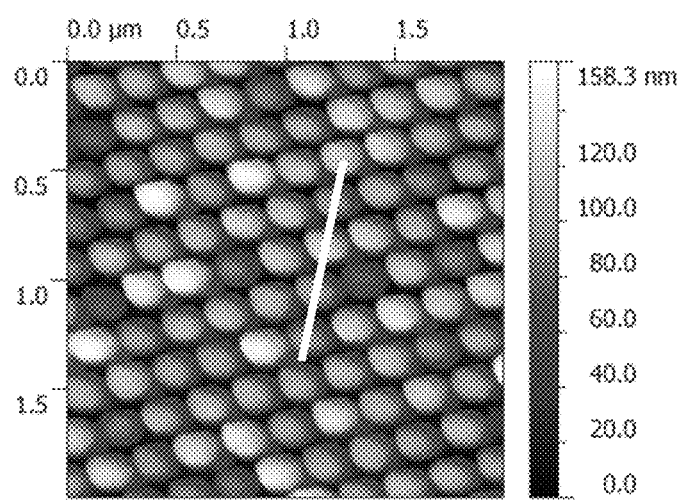

[Fig. 10]
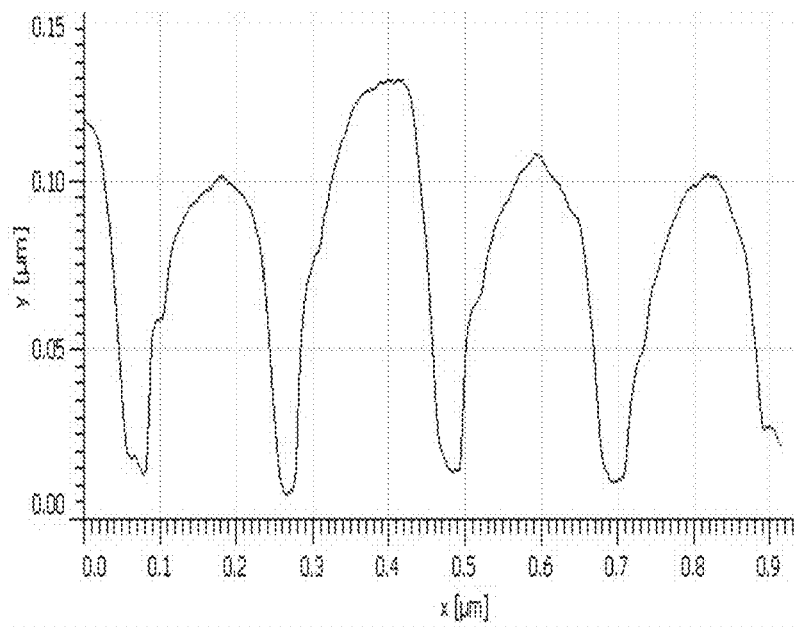
[Fig. 11]
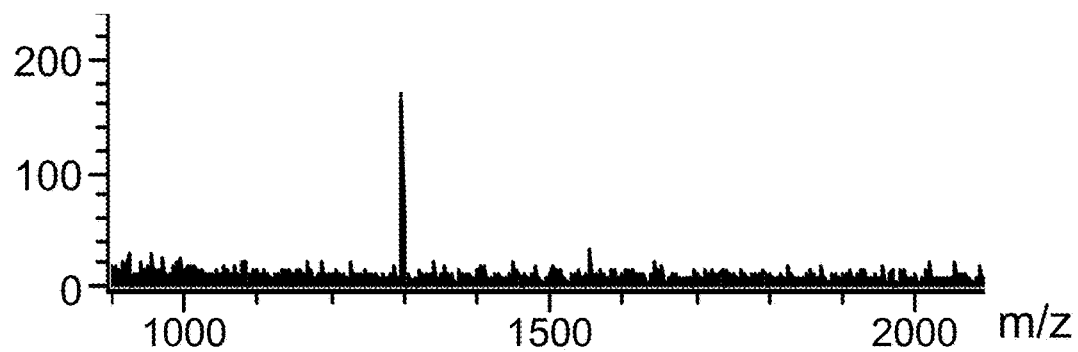
[Fig. 12]
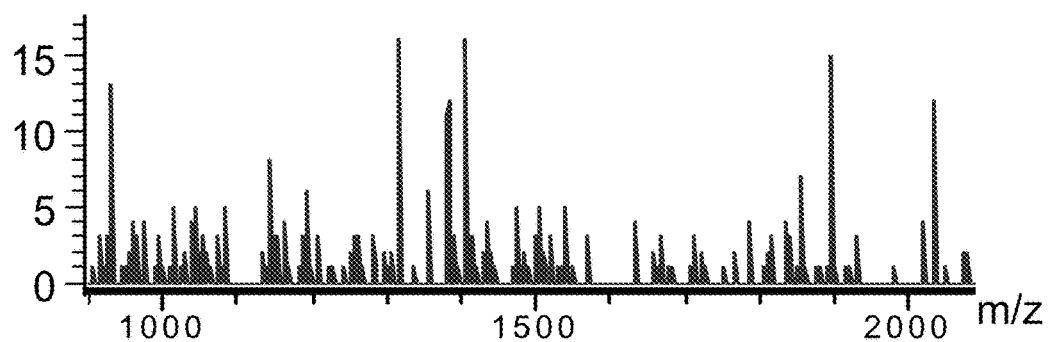

[Fig. 13]
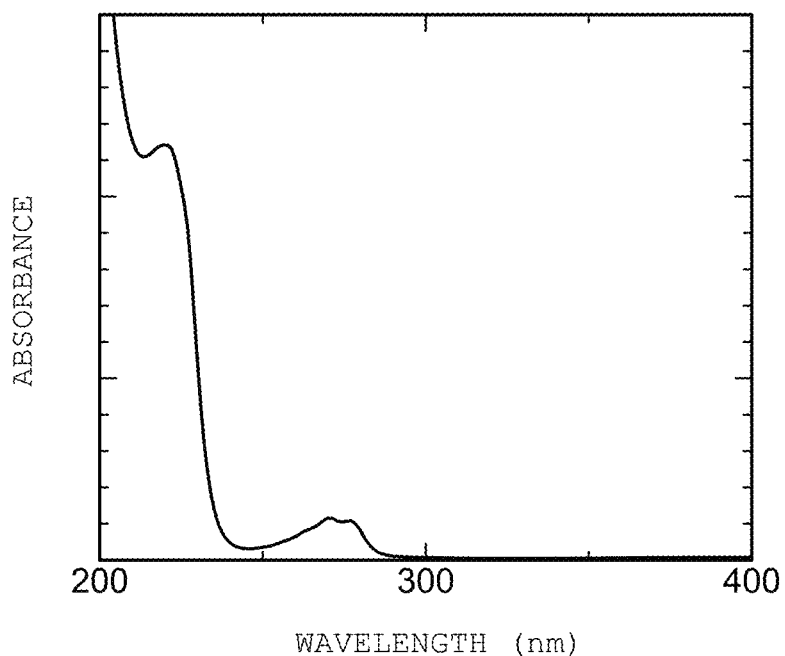
[Fig. 14]
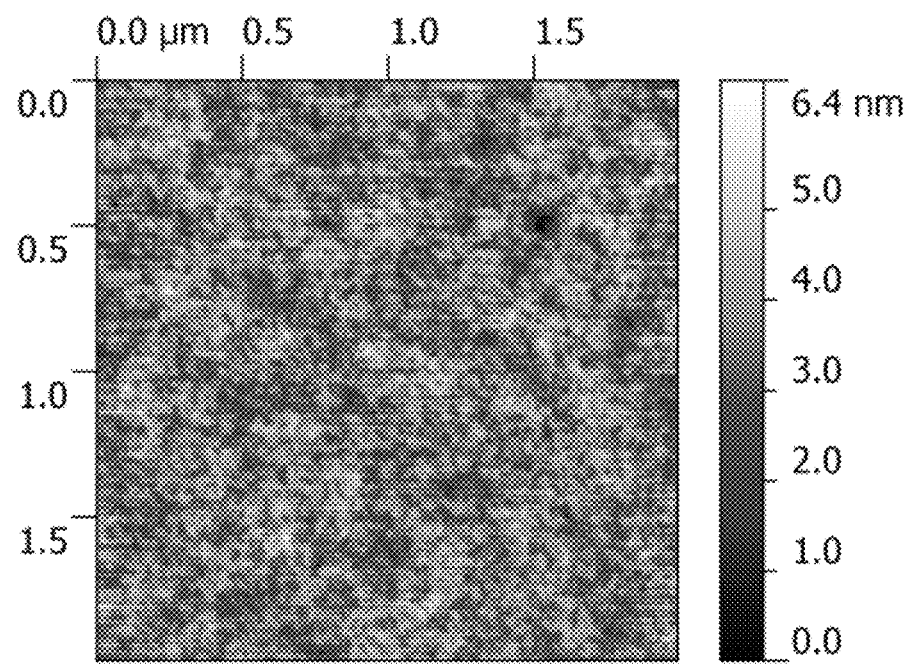

ORGANIC SILICA THIN FILM, METHOD FOR PRODUCING THE SAME, LASER DESORPTION/IONIZATION MASS SPECTROMETRIC SUBSTRATE USING THE SAME, AND LASER DESORPTION/IONIZATION MASS SPECTROMETRIC METHOD

TECHNICAL FIELD

The present invention relates to an organic silica thin film, a method for producing the same, a laser desorption/ionization mass spectrometric substrate using the same, and a laser desorption/ionization mass spectrometric method.

BACKGROUND ART

Thin films comprising organic silica having organic groups have been conventionally studied for their application to various fields, and as one of the fields, research has been conducted on the use of organic silica thin films in analysis substrates for laser desorption/ionization (LDI). For example, Japanese Unexamined Patent Application Publication No. 2014-115187 (PTL 1) proposes laser desorption/ionization using a thin film formed of an organic silica porous body as an analysis substrate, and a method for mass spectrometry in which an organic silica porous body having organic groups capable of absorbing an irradiation laser ray in its skeleton is allowed to support a sample containing measurement target molecules followed by irradiation with a laser ray for ionization of the measurement target molecules. Plus, when used in an analysis substrate for so-called laser desorption/ionization (LDI), such a thin film formed of an organic silica porous body described in PTL 1 makes it possible to carry out sufficiently efficient mass spectrometry without use of a matrix.

However, in the field of such an organic silica thin film, it is desired to develop an organic silica thin film which can be produced more efficiently by a simpler method than the conventionally known methods for producing an organic silica porous body, and a method for producing the same.

CITATION LIST

Patent Literature

[PTL 1]
Japanese Unexamined Patent Application Publication No. 2014-115187

SUMMARY OF INVENTION

Technical Problem

The present invention has been made in view of the above problems of the conventional art, and aims to provide an organic silica thin film which can be suitably used in an analysis substrate for laser desorption/ionization (LDI) and which can be produced more efficiently by a simpler method, a method for producing the organic silica thin film, a laser desorption/ionization mass spectrometric substrate using the organic silica thin film, and a laser desorption/ionization mass spectrometric method using the organic silica thin film.

Solution to Problem

The present inventors have made earnest studies to achieve the above object and found as a result that an organic silica thin film can be suitably used in an analysis substrate for laser desorption/ionization (LDI) and moreover can be produced more efficiently by a simpler method than conventional methods for producing an organic silica porous body when the organic silica thin film is a thin film comprising organic silica having a light absorbable organic group (organic group capable of absorbing light) in a skeleton, wherein the organic group has a local maximum absorption wavelength in a wavelength range of 200 to 1200 nm, a content ratio of silicon and the organic group which constitute the organic silica is in a range of 0.05 to 0.50 based on a ratio of a mass of the silicon to a mass of the organic group ([mass of the silicon]/[mass of the organic group]), the thin film has a textured structure, and an axis direction of the textured structure is a direction substantially perpendicular to a surface opposite to a surface of the organic silica thin film having the textured structure formed therein. This finding has led to the completion of the present invention.

Specifically, the organic silica thin film of the present invention is a thin film comprising:
organic silica having a light absorbable organic group in a skeleton, wherein
the organic group has a local maximum absorption wavelength in a wavelength range of 200 to 1200 nm,
a content ratio of silicon and the organic group which constitute the organic silica is in a range of 0.05 to 0.50 based on a ratio of a mass of the silicon to a mass of the organic group ([mass of the silicon]/[mass of the organic group]),
the thin film has a textured structure, and
an axis direction of the textured structure is a direction substantially perpendicular to a surface opposite to a surface of the organic silica thin film having the textured structure formed therein.

In addition, in the organic silica thin film of the present invention, the organic group preferably has a local maximum absorption wavelength in a wavelength range of 200 to 600 nm.

Moreover, in the organic silica thin film of the present invention, the organic silica thin film is preferably a porous film having a textured structure in which dent parts are formed of column-shaped pores or a thin film having a textured structure formed of a pillar array in which bump parts are formed of column-shaped bodies and the column-shaped bodies are arranged.

In addition, a method for producing an organic silica thin film of the present invention is a method comprising the step of:
obtaining an organic silica thin film by forming a textured structure by nanoimprinting in a film obtained from a sol solution obtained by partially polymerizing an organic silicon compound having a light absorbable organic group, followed by curing, wherein
the organic silicon compound is an organic silicon compound which has an organic group having a local maximum absorption wavelength in a wavelength range of 200 to 1200 nm as a light absorbable organic group and in which a content ratio of silicon and the organic group is in a range of 0.05 to 0.50 based on a ratio of a mass of the silicon to a mass of the organic group ([mass of the silicon]/[mass of the organic group]),
the organic silica thin film is a thin film comprising organic silica having a light absorbable organic group in a skeleton, the organic group in the thin film has a local maximum absorption wavelength in the wavelength range of 200 to 1200 nm, a content ratio of silicon and the organic group which constitute the organic silica is in a range of 0.05 to 0.50 based on a ratio of a mass of the silicon to a mass of the organic group ([mass of the silicon]/[mass of the organic group]), the thin film has a textured structure, and an axis direction of the textured structure is a direction substantially perpendicular to a surface opposite to a surface of the organic silica thin film having the textured structure formed therein.

In the method for producing an organic silica thin film of the present invention, the organic silica thin film is preferably a porous film having a textured structure in which dent parts are formed of column-shaped pores or a thin film having a textured structure formed of a pillar array in which bump parts are formed of column-shaped bodies and the column-shaped bodies are arranged.

A laser desorption/ionization mass spectrometric substrate of the present invention is used for a laser desorption/ionization mass spectrometric method, the substrate comprising the organic silica thin film of the present invention.

In addition, a laser desorption/ionization mass spectrometric method of the present invention is a method comprising the step of:

carrying out mass spectrometry by
using a substrate comprising the organic silica thin film of the present invention as an analysis substrate,
allowing the organic silica thin film to support a sample containing measurement target molecules, and
irradiating a sample supporting portion of the film with a laser ray to ionize the measurement target molecules.

Note that although it is not exactly clear why the present invention achieves the above object, the present inventors presume as described below.

Specifically, first, in the conventional laser desorption/ionization (LDI), a method has generally been employed which disperses measurement target molecules (for example, proteins, peptides, sugars, and the like) in a substance having a light absorption characteristic, called a matrix, followed by laser irradiation to ionize the measurement target molecules together with the matrix (so-called matrix-assisted laser desorption/ionization: MALDI). However, since mass spectrometric methods which use such matrix-assisted laser desorption/ionization (MALDI) disperse measurement target molecules in a substance having a light absorption characteristic, called a matrix, followed by laser irradiation to ionize the measurement target molecules together with the matrix, they have a problem that the success or failure of analysis is greatly affected by e.g. the selection of a matrix to be used and the quality of a mixture of the matrix and the measurement target molecules. In addition, mass spectrometric methods which use such matrix-assisted laser desorption/ionization (MALDI) also have a problem that a peak originating from the matrix is detected, and are not sufficient in terms of detection sensitivity.

In light of the above, the technique described in PTL 1 proposes use of a thin film comprising an organic silica porous body (mesoporous organic silica) as an analysis substrate. When such a thin film comprising an organic silica porous body (mesoporous organic silica) described in PTL 1 is used as an analysis substrate, it becomes unnecessary to use (add) a matrix, and a peak originating from the matrix is not detected at the time of detection. Therefore, it can be said that the laser desorption/ionization (LDI) described in PTL 1 is an analysis method sufficiently high in detection sensitivity and detection accuracy.

However, even in such laser desorption/ionization (LDI) described in PTL 1, the thin film comprising an organic silica porous body (mesoporous organic silica) as the analysis substrate is produced by use of a method which uses template materials such as a surfactant for the purpose of forming pores. Therefore, there has conventionally been a tendency that variations in e.g. pores (sizes, shapes, and positions thereof) occur for the production lots in the case where e.g. it is necessary to produce multiple substrates, making it difficult to reproducibly produce substrates with completely the same structures. In addition, since the thin film comprising an organic silica porous body described in PTL 1 requires the step of removing the template materials (such as a surfactant) during production, there has been a tendency that it is not always possible to efficiently obtain a thin film from the viewpoint of the load on working processes. Moreover, since the thin film comprising an organic silica porous body described in PTL 1 employs a production method which uses template materials (such as a surfactant) as described above, it is considered that there is also a tendency closed pores, considered to have a small contribution to the ionization of measurement target molecules, are formed in a large number in the structural body. Furthermore, regarding the organic silica porous body (mesoporous organic silica) described in PTL 1, it is considered that the template materials (such as a surfactant) used during production are detected as unnecessary peaks when the template materials (such as a surfactant) are remaining even in a small amount. Therefore, although the laser desorption/ionization using the thin film comprising an organic silica porous body described in PTL 1 is an analysis method sufficiently high in detection sensitivity and detection accuracy compared with previous laser desorption/ionization (LDI), it is desired to develop a method which enables even higher detection sensitivity and detection accuracy and a thin film to which that method can be applied. Note that it is possible to think of the employment of, for example, known nanolithography method and nanoetching method as other methods for producing a substrate (analysis substrate) having a nano-surface structure, but such methods have a complicated production process in the first place, leaving a problem in terms of easily producing a substrate. In addition, other methods for producing such a solid substrate having a nano-surface structure also requires a complicated and expensive step such as a vacuum process, and are not sufficient from an economical point of view. Furthermore, when the nanolithography method or the nanoetching method is employed for the purpose of producing a substrate (analysis substrate) having a nano-surface structure, it is also difficult to increase the area due to the complexity.

In light of the above, the present inventors have made earnest studies to achieve the above object and found as a result that, although the reason is not exactly clear, use of an organic silicon compound which has an organic group having a local maximum absorption wavelength in a light absorbable wavelength range of 200 to 1200 nm and in which a content ratio of silicon and the organic group is in a range of 0.05 to 0.50 based on a ratio of a mass of the silicon to a mass of the organic group (organic group having a local maximum absorption wavelength in a wavelength range of 200 to 1200 nm) ([mass of the silicon]/[mass of the organic group]) makes it possible to form a textured structure by nanoimprinting in a film obtained from a sol solution obtained from that organic silicon compound (film obtained using the sol solution), in other words, use of the organic silicon compound as an organic silica material (more preferably, use of a film obtained from a sol solution of the organic silicon compound, which is generated by sol-gel polycondensation reaction from the organic silicon compound) makes it possible for the first time to apply the nanoimprinting technique to the production of organic silica thin films. This finding has led to the completion of the present invention. Note that the present inventors presume that, when a film obtained from the sol solution of the organic silicon compound during production as described above is used to adjust the silicon content in the organic silica thin film finally obtained, it becomes possible to efficiently produce an organic silica thin film by nanoimprinting treatment while suppressing the progress of the excessive cross-linking reaction during film formation. The present inventors presume that, as a result, the present invention makes it possible to produce an organic silica thin film by a simple method such as nanoimprinting, to improve productivity, and also to sufficiently reproducibly and efficiently produce organic silica thin films having the same structures. In addition, the textured structure possessed by the thin film obtained in the present invention is such that an axis direction of the textured structure is a direction substantially perpendicular to a surface opposite to a surface of the organic silica thin film having the textured structure formed therein. The present inventors presume that the textured structure oriented in a substantially perpendicular direction as described above (for example, a nanoporous structure in which the axes of the pores are arranged in a substantially perpendicular direction; a pillar array structure in which the axes of the column-shaped bodies are arranged in a substantially perpendicular direction; and the like) makes it possible to increase the surface area of the thin film having the textured structure and, when used for laser desorption/ionization (LDI), to smoothly and efficiently emit measurement target molecules (analysis target molecules) desorbed and ionized due to light excitation to the outside of the thin film (analysis substrate). As described above, since the present invention does not use the template materials as mentioned earlier (molecular template materials: such as a surfactant) for the formation of a nanoporous structure but forms a textured structure by a simple method such as nanoimprinting, the productivity of the thin film is greatly improved. In addition, the present inventors presume that since the thin film obtained in that way does not use the template materials (such as a surfactant), no peaks originating from the residual templates are detected in the case of using laser desorption/ionization (LDI), making it possible to detect (making it easier to detect) the measurement target molecules (analysis target molecules) with further higher sensitivity. Moreover, since the organic group is an organic group having a local maximum absorption wavelength in a wavelength range of 200 to 1200 nm, a laser ray can be absorbed by an organic group appropriately selected depending on the wavelength range used in laser desorption/ionization (LDI). This enables more efficient absorption of a laser ray in a wavelength region used in mass spectrometry and also efficient use of the optical energy. Therefore, it becomes possible in laser desorption/ionization (LDI) to more efficiently desorb and ionize measurement target molecule (analysis target molecules). Note that the organic silica thin film, which is obtained by forming a textured structure by nanoimprinting in a film of a sol solution obtained from the organic silicon compound as described above (organic silicon compound having the specific light absorbable organic group) followed by curing, is a thin film comprising organic silica having a light absorbable organic group in a skeleton, the organic group in the thin film has a local maximum absorption wavelength in a wavelength range of 200 to 1200 nm, and furthermore a content ratio of the organic group and silicon which are components constituting the organic silica forming the thin film is a value in a range of 0.05 to 0.50 based on a ratio of a mass of the silicon to a mass of the organic group ([mass of the silicon]/[mass of the organic group]). Moreover, the thin film obtained in this way has not only a textured structure but also is such that an axis direction of the textured structure is a direction substantially perpendicular to a surface opposite to a surface of the organic silica thin film having the textured structure formed therein. For those reasons, the production method of the present invention makes it possible to efficiently produce ones same as the organic silica thin film of the present invention. The present inventors presume that the organic silica thin film of the present invention obtainable in this way can be suitably used in an analysis substrate for laser desorption/ionization (LDI) thanks to its structural characteristics and further can be more efficiently produced by a simpler method than the conventionally methods. In addition, the present inventors presume that since the method for producing an organic silica thin film of the present invention as described above is a method which uses the nanoimprinting method, it is easy to increase the area.

Advantageous Effects of Invention

The present invention makes it possible to provide an organic silica thin film which can be suitably used as an analysis substrate for laser desorption/ionization (LDI) and which can be produced more efficiently by a simpler method, a method for producing the organic silica thin film, a laser desorption/ionization mass spectrometric substrate using the organic silica thin film, and a laser desorption/ionization mass spectrometric method using the organic silica thin film.

BRIEF DESCRIPTION OF DRAWINGS

FIG. 1 is a schematic vertical cross-sectional view schematically illustrating a preferable embodiment of a structural body (multi-layer structural body: layer stack) provided with an organic silica thin film.

FIG. 2 is an enlarged diagram of region R of the structural body provided with the organic silica thin film illustrated in FIG. 1.

FIG. 3 is a graph illustrating an ultraviolet/visible absorption spectrum of the organic silica thin film obtained from a compound represented by a general formula (A) used in Example 1.

FIG. 4 is an atomic force microscope (AFM) image of the surface of the organic silica thin film obtained in Example 1.

FIG. 5 is a scanning electron microscope (SEM) image of the cross section of the organic silica thin film obtained in Example 1.

FIG. 6 is a graph of a mass spectrum (LDI-MS spectrum) measured in Example 2.

FIG. 7 is a graph of a mass spectrum (LDI-MS spectrum) measured in Example 3.

FIG. 8 is an atomic force microscope (AFM) image of the surface of a nanomold obtained in Example 4.

FIG. 9 is an atomic force microscope (AFM) image of the surface of the organic silica thin film obtained in Example 4.

FIG. 10 is a cross-sectional view along a white line of the atomic force microscope (AFM) image of the surface of the organic silica thin film illustrated in FIG. 9.

FIG. 11 is a graph of a mass spectrum (LDI-MS spectrum) measured in Example 5.

FIG. 12 is a graph of a mass spectrum (LDI-MS spectrum) measured in Comparative Example 1.

FIG. 13 is a graph illustrating an ultraviolet/visible absorption spectrum of the organic silica thin film obtained from a compound represented by a general formula (C) used in Comparative Example 2.

FIG. 14 is an atomic force microscope (AFM) image of the surface of the organic silica thin film obtained in Comparative Example 2.

DESCRIPTION OF EMBODIMENTS

Hereinafter, description is provided for preferred embodiments of the present invention in detail with reference to the drawings. In the following description and the drawings, the same or corresponding elements are denoted by the same reference numerals, and redundant description is omitted.

[Organic Silica Thin Film]

An organic silica thin film of the present invention is a thin film comprising:

organic silica having a light absorbable organic group in a skeleton, wherein the organic group has a local maximum absorption wavelength in a wavelength range of 200 to 1200 nm, a content ratio of silicon and the organic group which constitute the organic silica is in a range of 0.05 to 0.50 based on a ratio of a mass of the silicon to a mass of the organic group ([mass of the silicon]/[mass of the organic group]), the thin film has a textured structure, and an axis direction of the textured structure is a direction substantially perpendicular to a surface opposite to a surface of the organic silica thin film having the textured structure formed therein.

The organic silica constituting such a thin film has a light absorbable organic group in a skeleton. Here, "light absorbable" does not particularly limit the absorption wavelength and the like and may be the ability to absorb light of a certain wavelength. In addition, the "light absorbable organic group" in the present invention is an organic group having an absorption local maximum wavelength in a wavelength range of 200 to 1200 nm (more preferably 200 to 600 nm, further preferably 250 to 450 nm, and particularly preferably 300 to 400 nm). Consider the case where the absorption local maximum wavelength of such an organic group is less than the lower limit. For example, when the thin film is used for laser desorption/ionization (LDI) and light (laser ray) of such a wavelength is absorbed, the organic group in the organic silica thin film and the measurement target object are decomposed by the light. Therefore, there is a tendency that, as a result, efficient mass spectrometry becomes difficult. On the other hand, if the upper limit is exceeded, there may be a case where application is difficult depending on the application field (usage). For example, consider the case where an organic silica thin film provided with the organic group is used for laser desorption/ionization (LDI). When the absorption local maximum wavelength of the organic group exceeds the upper limit, there is a tendency that it is difficult to obtain optical energy necessary for the ionization of measurement target molecules even in the case of irradiation with the light of such a wavelength followed by absorption thereof. As described above, the organic group is applicable to various fields when it has an absorption local maximum wavelength in the wavelength range. For example, it becomes possible to more efficiently absorb a laser ray in a wavelength region used for mass spectrometry for the purpose of application in laser desorption/ionization (LDI).

Examples of such a "light absorbable organic group" include organic groups having a structural part capable of absorbing a laser ray used for mass spectrometry. Although it depends on the wavelength of the laser ray used in mass spectrometry, examples of such organic groups include organic groups having an aromatic ring as a structural part capable of absorbing a laser ray (for example, triphenylamine, naphthalimide, fluorene, acridone, methyl acridone, quaterphenyl, anthracene, and the like). As described above, examples of the light absorbable organic group (organic group having an absorption local maximum wavelength in a wavelength range of 200 to 1200 nm) include triphenylamine, naphthalimide, styrylbenzene, fluorene, divinylbenzene, divinylpyridine, acridone, methyl acridone, quaterphenyl, and anthracene, each of which may have a substituent.

Moreover, such a light absorbable organic group (organic group having an absorption local maximum wavelength in a wavelength range of 200 to 1200 nm) is preferably a group having two or more (more preferably 3 or more) aromatic rings (aromatic organic group). In addition, such an organic group is more preferably an aromatic organic group containing 10 or more carbon atoms. Such an aromatic organic group makes it possible to more efficiently absorb a laser ray. Examples of such an aromatic organic group include triphenylamine, naphthalimide, styrylbenzene, fluorene, acridone, methyl acridone, quaterphenyl, anthracene, pyrene, acridine, phenylpyridine, perylene, perylene bisimide, diphenylpyrene, tetraphenylpyrene, porphyrins, phthalocyanine, diketopyrrolopyrroles, and dithienylbenzothiadiazole, each of which may have a substituent. In addition, as the organic group, the organic silica thin film may be one having one kind of organic group singly or may be one having two or more kinds of organic groups in combination.

Such an organic group preferably contains at least one of triphenylamine, naphthalimide, pyrene, perylene, and acridone (at least one of the organic groups is at least one of triphenylamine, naphthalimide, pyrene, perylene, and acridone) because of further easiness of application to various fields and from the viewpoint e.g. that they exhibit oxidation/reduction activity by light irradiation and that they are stable.

In addition, "organic group in a skeleton" in the present invention means that the organic group present is directly or indirectly bonded (via other elements) to the silicon (Si) forming the silica skeleton of the silica thin film. Note that such an organic silica thin film preferably has an organic group introduced in the skeleton thanks to the structure (cross-linking structure) in which silicon atoms forming the siloxane structure (formula: —(Si—O)$_y$— structure) are cross-linked by the organic group.

In addition, the organic silica thin film of the present invention is one in which a content ratio of silicon and the organic group (the "organic group" mentioned here refers to a light absorbable organic group and to an organic group having an absorption local maximum wavelength in a wavelength range of 200 to 1200 nm), both of which constitute the organic silica, is in a range of 0.05 to 0.50 (more preferably 0.10 to 0.40, further preferably 0.10 to 0.35, and particularly preferably 0.15 to 0.35) based on a ratio of a mass of the silicon to a mass of the organic group ([mass of the silicon]/[mass of the organic group]). When such a mass ratio ([mass of the silicon]/[mass of the organic group]) is less than the lower limit, the cross-linking density of the organic silica thin film reduces, resulting in a tendency that the film is not sufficiently hardened. On the other hand, when the upper limit is exceeded, the cross-linking degree excessively increases in the stage of film formation, resulting in a tendency that it is difficult to form a textured structure (for example, porous structure) by nanoimprinting.

In addition, as such an organic silica thin film, it is possible to suitably use a thin film comprising a polymer (condensate) of an organic silicon compound which has an organic group having a local maximum absorption wavelength in a wavelength range of 200 to 1200 nm as a light absorbable organic group and in which a content ratio of silicon and the organic group is in a range of 0.05 to 0.50 (more preferably 0.10 to 0.40, further preferably 0.10 to 0.35, and particularly preferably 0.15 to 0.35) based on a ratio of a mass of the silicon to a mass of the organic group ([mass of the silicon]/[mass of the organic group]). When such a mass ratio ([mass of the silicon]/[mass of the organic group]) is less than the lower limit, the cross-linking density reduces, resulting in a tendency that the film is not sufficiently hardened. On the other hand, when the upper limit is exceeded, the cross-linking degree excessively increases in the stage of film formation, resulting in a tendency that it is difficult to form a textured structure (for example, porous structure) by nano imprinting.

Such an organic silicon compound is preferably an organic silicon compound which is represented by the following general formulas (1-i) to (1-iv):

[Chem. 1]

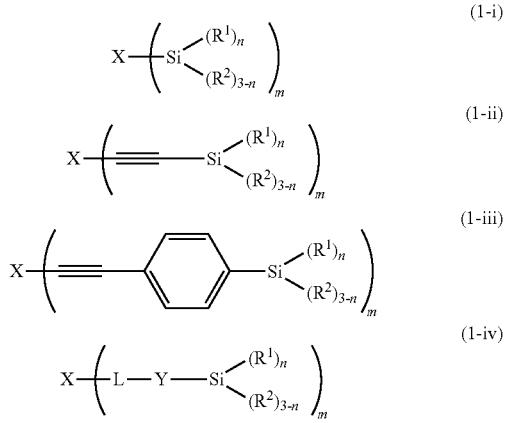

(in the formulas (1-i) to (1-iv), X represents an m-valent organic group, $R^1$ represents at least one selected from the group consisting of alkoxy groups (preferably alkoxy groups having 1 to 5 carbon atoms), hydroxyl groups (—OH), allyl groups ($CH_2$=CH—$CH_2$—), ester groups (preferably ester groups having 1 to 5 carbon atoms), and halogen atoms (chlorine atoms, fluorine atoms, bromine atoms, and iodine atoms), $R^2$ represents at least one selected from the group consisting of alkyl groups and hydrogen atoms, n and (3-n) respectively represent the numbers of $R^1$'s and $R^2$'s bonded to silicon (Si) atoms, n represents an integer of 1 to 3, m represents an integer of 1 to 4, L in the formula (1-iv) represents a single bond or any one divalent organic group selected from the group consisting of ether groups, ester groups, amino groups, amide groups, and urethane groups, and Y in the formula (1-iv) represents an alkylene group having 1 to 4 carbon atoms)

and in which a content ratio of silicon and the light absorbable organic group is in a range of 0.05 to 0.50 based on a ratio of a mass of the silicon to a mass of the light absorbable organic group ([mass of the silicon]/[mass of the organic group]). Consider the "light absorbable organic group" in the compounds represented by such general formulas (1-i) to (1-iv). In the compound represented by the general formula (1-i), the group represented by X in the formula (m-valent organic group (bonds omitted)) is the "light absorbable organic group." In the compound represented by the general formula (1-ii), the organic group represented by the formula:

[Chem. 2]

(in the formula (I), X represents an m-valent organic group, and m represents an integer of 1 to 4 (as described above, X and m have the same meanings as those of X and m in the general formulas (1-i) to (1-iv)))
is the "light absorbable organic group." In addition, in the compound represented by the general formula (1-iii), the organic group represented by the formula:

[Chem. 3]

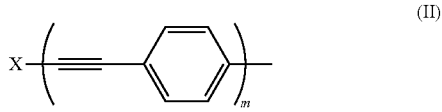

(in the formula (II), X represents an m-valent organic group, and m represents an integer of 1 to 4 (as described above, X and m have the same meanings as those of X and m in the general formulas (1-i) to (1-iv)))
is the "light absorbable organic group." In the compound represented by the general formula (1-iv), the organic group represented by the formula:

$$X\text{-}(L\text{-}Y)_m\text{-} \quad (III)$$

(in the formula (III), X represents an m-valent organic group, L represents a single bond or any one divalent organic group selected from the group consisting of ether groups, ester groups, amino groups, amide groups, and urethane groups, Y represents an alkylene group having 1 to 4 carbon atoms, and m represents an integer of 1 to 4 (as described above, X, L, Y and m have the same meanings as those of X, L, Y, and m in the general formula (1-iv)) is the "light absorbable organic group." As described above, the "light absorbable organic group" is the organic group of the structural part which is a group bonding to silicon in the compound and which contains the group represented by X in the formula.

The organic silica thin film of the present invention is preferably an organic silica thin film comprising a polymer of at least one organic silicon compound selected from the group consisting of organic silicon compounds which are represented by the above general formulas (1-i) to (1-iv) and in which a content ratio of silicon and the light absorbable organic group is in a range of 0.05 to 0.50 based on a ratio of a mass of the silicon to a mass of the light absorbable organic group ([mass of the silicon]/[mass of the organic group]) (hereinafter, the group consisting of those organic silicon compounds is simply referred to as the "compound group (A)" in some cases for convenience). As described above, the organic silica thin film of the present invention is preferably an organic silica thin film comprising a polymer of one organic silicon compound selected from the compound group (A).

Such an organic silica thin film comprising a polymer of at least one organic silicon compound selected from the compound group (A) tends to make it possible to more efficiently exhibit a so-called light-collecting antenna function (light-trapping antenna function) and thus tends to make it possible to more efficiently ionize measurement target molecules. Note that the "light-collecting antenna function" mentioned here refers to a function of absorbing optical energy when irradiated with light and concentrating the excited energy inside the pores, and use of this function tends to make it possible to more efficiently transfer the optical energy of the absorbed laser ray to the measurement target molecules supported inside the pores. Note that the definition of such a "light-collecting antenna function" is the same as the definition described in Japanese Unexamined Patent Application Publication No. 2008-084836.

In addition, the polymer of at least one organic silicon compound selected from the compound group (A) is one that has a structure (cross-linking structure) in which silicon atoms forming the siloxane structure (structure represented by the formula: —(Si—O)$_y$—) are cross-linked by the organic group and thus has a structure having the organic group in the skeleton (so-called "cross-linked type organic silica thin film"). Here, description is provided for the cross-linking structure taking as an example the polymerization reaction of the organic silicon compound which is represented by the above general formula (1-i) and in which $R^1$ is an ethoxy group, n is 3, and m is 2. By a reaction as represented by the following general formula (2):

[Chem. 4]

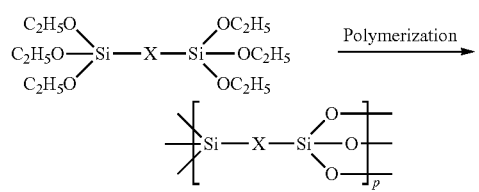

(2)

(in the formula, X represents an m-valent organic group, and p represents an integer corresponding to the number of repeating units),
the organic silica thin film obtained after the polymerization is one that has a repeating unit with a structure in which silicon atoms forming the siloxane structure (structure represented by the formula: —(Si—O)$_y$—) are cross-linked by the organic group (X) (note that the value of p is not particularly limited, but is preferably in a range of about 10 to 1000 in general). Note that, when such a cross-linking structure is formed (when the organic silica thin film is the cross-linked type organic silica thin film) and used for mass spectrometry, it tends to more efficiently absorb the irradiation laser ray and to more efficiently transfer the excited energy to the measurement target molecules supported inside the pores of the organic silica thin film. Note that, in the present invention, in the organic silica comprising a polymer having the repeating unit represented by the general formula (2), the ratio between the total amount (mass) of the organic group (X) and the total amount (mass) of Si in the organic silica ([mass of the silicon]/[mass of the organic group]) is a value in a range of 0.05 to 0.50.

In addition, $R^1$ in the above general formulas (1-i) to (1-iv) is preferably an alkoxy group and/or a hydroxyl group from the viewpoint of easily controlling the condensation reaction (polymerization reaction). Note that, when more than one $R^1$ is present in the same molecule, the $R^1$'s may be the same or different. Such an alkyl group which can be selected as $R^2$ in the general formulas (1-i) to (1-iv) is preferably an alkyl group having 1 to 5 carbon atoms. Note that, when more than one $R^2$ is present in the same molecule, the $R^2$'s may be the same or different.

In the above general formulas (1-i) to (1-iv), n and (3-n) in the formulas respectively represent the numbers of $R^1$'s and $R^2$'s bonded to silicon (Si) atoms. Although n represents an integer of 1 to 3, n is particularly preferably 3 from the viewpoint that it is possible to more stabilize the structure after condensation.

Moreover, m in the above general formulas (1-i) to (1-iv) represents the number of silicon (Si) atoms directly or indirectly bonded to the organic group (X). Such m represents an integer of 1 to 4. Such m is more preferably 2 to 4 (particularly preferably 2 or 3) from the viewpoint of easily forming a stable siloxane network.

In addition, L in the formula (1-iv) is more preferably a single bond or an ether group from the viewpoint of achieving high chemical stability. Note that, when more than one L is present in the same molecule, the L's may be the same or different. Moreover, Y in the formula (1-iv) is more preferably an ethylene group or a propylene group from the viewpoint of achieving both flexibility of the film and high densification of silicon after polymerization. Note that, when more than one Y is present in the same molecule, the Y's may be the same or different.

In addition, X in the above general formulas (1-i) to (1-iv) represents an m-valent organic group. In addition, such an m-valent organic group is particularly preferably any of the organic groups represented especially by the following general formulas (101) to (111):

[Chem. 5]

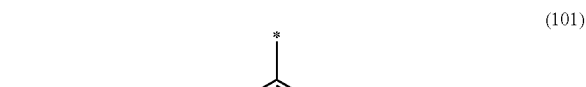

(101)

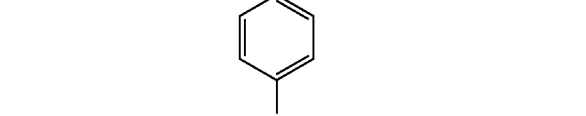

(102)

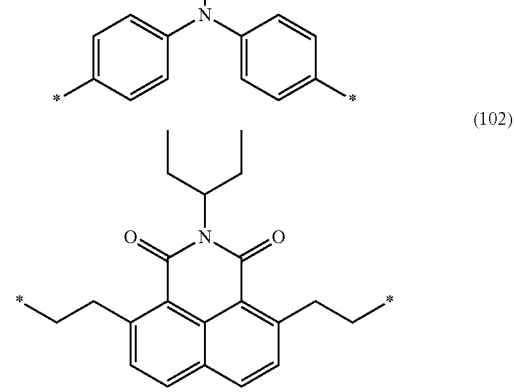

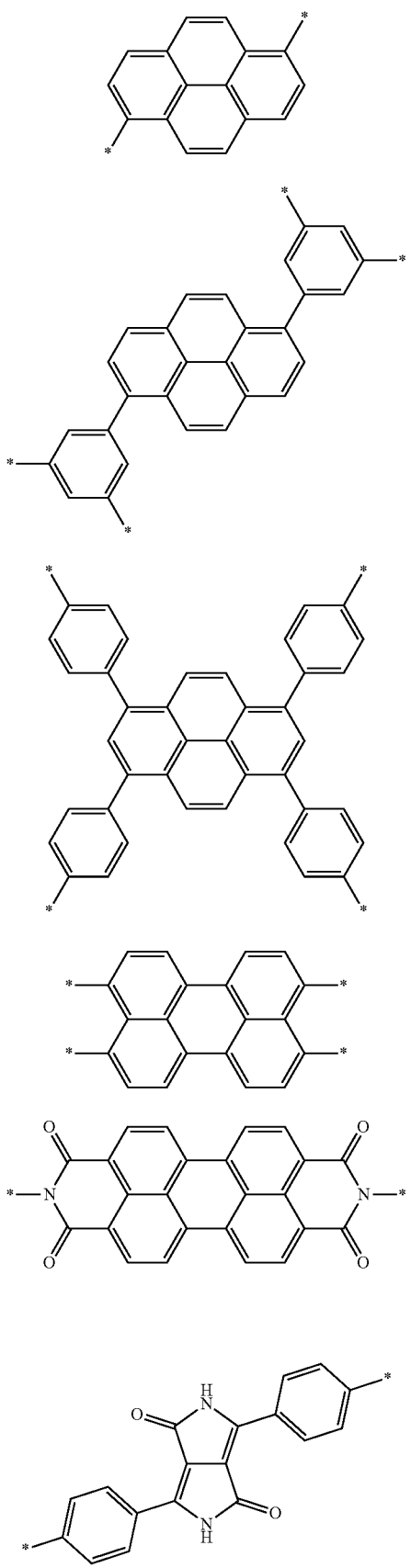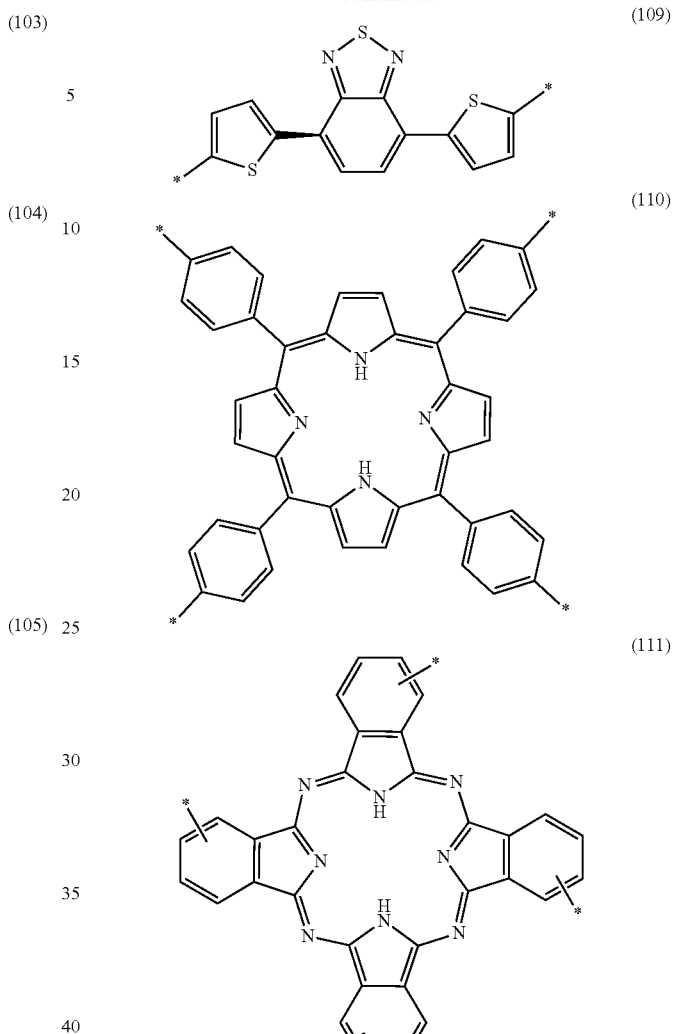

(in the general formulas (101) to (111), the symbol * means that the bond added with the symbol is a bond which binds to X in the above formulas (1-i) to (1-iv)).

Note that, in such organic groups represented by the general formulas (101) to (111), the bonds represented by the symbol * are more preferably directly bonded to silicon from the viewpoint of stable immobilization and high densification of the organic group.

Such an organic group (X in the formulas (1-i) to (1-iv)) is more preferably any of the organic groups represented by the above general formulas (101) to (109) (organic groups represented by the above formulas (101), (102), (103), (104), (105), (106), (107), (108), and (109)), further preferably any of the organic groups represented by the above general formulas (101) to (106), and particularly preferably the organic group represented by the above general formula (101) (triphenylamine) or the organic group represented by the above general formula (102) (naphthalimide). In addition, the organic silica thin film having such an organic group in the skeleton may be one having one kind of organic group singly or may be one having two or more kinds of organic groups in combination. Note that examples of the organic silica thin film having two or more kinds of organic groups in combination include polymers of organic silicon compounds of two or more kinds which are represented by any of the above general formulas (1-i) to (1-iv) and which have different kinds of X.

Note that the polymer of at least one organic silicon compound selected from the aforementioned compound group (A) may contain, in the organic silicon compound for preparation of the polymer, a different organic silicon compound other than one selected from the aforementioned compound group (A) as long as the effects of the present invention are not impaired (for example, as long as the thin film itself satisfies the conditions of e.g. the ratio of the mass of the silicon to the mass of the organic group). Examples of such a different organic silicon compound include tetraalkoxysilanes such as tetramethoxysilane, tetraethoxysilane, and tetrabutoxysilane.

In addition, the organic silica thin film of the present invention has a textured structure. Such a textured structure is preferably a porous structure having column-shaped gap pores formed therein or a pillar array structure having column-shaped bodies arranged thereon. Note that "column-shaped" mentioned here is a concept which also includes so-called column-shaped ones such as substantial cylinders and substantial polygonal prisms as well as ones having both end portions of different sizes (such as diameter and length) such as substantial cones and substantial polygonal pyramids. Such a textured structure can be efficiently produced by nanoimprinting. For example, when the mold used for nanoimprinting is one that has a pillar array structure, a porous structure transcribed with the characteristics thereof can be the textured structure of the thin film. Conversely, when the mold used for nanoimprinting is one that has a porous structure having column-shaped gap pores formed therein, a pillar array structure transcribed with the characteristics thereof can be the textured structure of the thin film. In addition, when a textured structure is formed by nanoimprinting (when textured structure being a nanoimprint transcribing structure is formed), a mold having a textured structure may be used to form a textured structure by repeating transcription and inversion thereof.

In addition, in the present invention, an axis direction of such a textured structure is a direction substantially perpendicular to a surface opposite to a surface of the organic silica thin film having the textured structure formed therein. This is briefly described with reference to the drawings. FIG. 1 is a schematic vertical cross-sectional view schematically illustrating a preferable embodiment of a structural body (multi-layer structural body: layer stack) provided with an organic silica thin film of the present invention. The layer stack (multi-layer structural body) illustrated in FIG. 1 includes a substrate 1 and an organic silica thin film 2 (note that such a substrate 1 is described later).

The "axis direction of the textured structure is a direction substantially perpendicular to a surface opposite to a surface of the organic silica thin film having the textured structure formed therein" in the present invention means that, for example when the gaps of the textured portion of the organic silica thin film 2 (spaces between dent parts) are column-shaped pores (when the organic silica thin film 2 has a porous structure), the direction of the longitudinal axis of the spatial shape of the pores (shape of the gaps) is substantially perpendicular to the surface $S_2$ opposite to the surface $S_1$ of the organic silica thin film 2 having the textured structure formed therein, and when the bump parts of the textured portion of the organic silica thin film 2 are column-shaped bodies (pillar shaped) (when the organic silica thin film 2 has a pillar array structure), the direction of the longitudinal axis of the column-shaped bodies (pillar shaped) is substantially perpendicular to the surface $S_2$ opposite to the surface $S_1$ of the organic silica thin film 2 having the textured structure formed therein. As described above, the "axis direction of the textured structure" refers to the direction of the longitudinal axis of the pores when the textured structure is a porous structure and refers to the direction of the longitudinal axis of the column-shaped bodies (pillars) when the textured structure is a pillar array structure. In addition, the "longitudinal axis" mentioned here refers to the axis of the longitudinal direction passing through the gravity center point of the pore gap shape or the column-shaped body, and can be obtained based on the vertical cross-sectional view.

Here, description is provided for the concept "substantially perpendicular" in the present invention with reference to FIG. 2. FIG. 2 is an enlarged diagram of the region R illustrated in FIG. 1. Here, description is provided taking as an example the case where the gaps of the textured portion illustrated in FIG. 1 and FIG. 2 (spaces between dent parts) are column-shaped pores (case where a porous structure having column-shaped pores as the dent parts is formed). The situation where the axis direction of the textured structure is a direction substantially perpendicular to the surface $S_2$ means that the longitudinal axis C of the pore spatial shape (gap column shape) (longitudinal axis C of the pore) forms an angle α in a range of 90°±30° (more preferably 90°±20°) with respect to the surface $S_2$ opposite to the surface $S_1$ of the organic silica thin film 2 having the textured structure formed therein. Note that, also in the case where the bump parts are column-shaped bodies (pillar shaped) (case where the organic silica thin film 2 has a pillar array structure), the situation where the axis direction of the textured structure is a direction substantially perpendicular to the surface $S_2$ means that the longitudinal axis of the column-shaped bodies (pillar shaped) forms an angle in a range of 90°±30° (more preferably 90°±20°) with respect to the surface $S_2$ opposite to the surface $S_1$ of the organic silica thin film 2 having the textured structure formed therein.

As described above, in the present invention, in the textured structure formed in the organic silica thin film 2, the axis direction of the textured structure is a direction substantially perpendicular (90°±30°, more preferably 90°±20°) to the surface $S_2$ of the organic silica thin film 2 (such a direction that the angle formed by the axis direction of the textured structure and the surface $S_2$ of the organic silica thin film 2 is substantially perpendicular (90°±30°, more preferably 90°±20°)). Note that, when the axis direction of the textured structure formed in the organic silica thin film 2 is not the direction described above, it tends to be difficult to desorb and vaporize molecules adsorbed to the gaps of the texture (pore spaces in the case of pores) to the outside of the film even when used for mass spectrometry and irradiated with a laser ray. Note that, in the case of the layer stack (multi-layer structural body) illustrated in FIG. 1, the surface $S_2$ of the organic silica thin film 2 is flat, the organic silica thin film 2 is stacked on the substrate 1, and the surface $S_2$ is a surface facing the surface of the substrate 1. In addition, as described below, determination is made as to whether or not the axis direction of the textured structure is a direction substantially perpendicular to the surface $S_2$ of the organic silica thin film 2. Specifically, consider the case of obtaining a cross-section of the organic silica thin film by atomic force microscope (AFM) measurement and measuring 100 or more randomly selected axis directions of the textured structure. When any of the axis directions of the texture is substantially perpendicular (90°±30°, more preferably 90°±20°) to the surface opposite to the surface having the textured structure formed therein, it is possible to make a determination that the axis direction of the textured structure is substantially perpendicular to the surface opposite to the surface having the textured structure formed therein.

In addition, such an organic silica thin film is preferably a porous film having a textured structure in which dent parts are formed of column-shaped pores or a thin film having a textured structure formed of a pillar array in which bump parts are formed of column-shaped bodies and the column-shaped bodies are arranged.

Specifically, such a textured structure is preferably a textured structure in which the dent parts are formed of column-shaped pores or a textured structure formed of the pillar array in which the bump parts are formed of column-shaped bodies and the column-shaped bodies are arranged.

In such a textured structure of the organic silica thin film, the average value of the distance between bump part walls is preferably 5 to 500 nm, more preferably 5 to 200 nm, and further preferably 5 to 100 nm. When such an average value of the distance between bump part walls is less than the lower limit, it tends to be difficult to introduce molecules of large molecular weight into the gaps of the texture (pore spaces in the case of pores) for adsorption. On the other hand, when the upper limit is exceeded, there is a tendency to fail to sufficiently obtain the effect of increasing the surface area by formation of a textured structure. Note that it is possible to obtain such an average value of the distance between bump part walls as follows. An atomic force microscope (AFM) is used to measure the textured structure and obtain a cross-sectional view (vertical cross-sectional view) of the textured structure. For 100 or more randomly selected bump parts, the cross-sectional view is used to obtain the distance (horizontal distance) between walls of the bump part and the nearest bump part at a position where the height of the bump part is half the average bump part height to be described later (note that the height position of the bump part used for measuring the distance between walls is obtained for each bump part assuming that the height reference (height is 0 nm) is the lowest point of the dent part between that bump part and the nearest bump part). Finally, the average value thereof is calculated. Note that, when assuming that the distance between bump parts is the inter-wall distance (horizontal distance) between the nearest bump parts at a position where the height of the bump part is half the average bump part height to be described later, it is possible to measure the distance between column-shaped bodies even when the bump parts are ones having the shape of column-shaped bodies with different sizes of both end portions (such as diameter and length). This makes it possible to appropriately consider the design depending on the kind of e.g. measurement target molecule introduced into the dent parts. Specifically, it is possible to use the inter-wall distance between bump parts as an index of the size of dent part gap size. Note that, in the case of a textured structure in which the dent parts are formed of column-shaped pores, such a distance between bump part walls can be regarded as the diameter of the pores. From the above viewpoint, it can be said that, in the case of a textured structure in which the dent parts are formed of column-shaped pores, the average pore diameter of the pores is preferably 5 to 500 nm (more preferably 5 to 200 nm and further preferably 5 to 100 nm). Likewise, it can be said that, in the case of a textured structure formed of the pillar array in which the bump parts are formed of column-shaped bodies and the column-shaped bodies are arranged, the average value of the distance between bump part walls (distance between pillars) is preferably 5 to 500 nm (more preferably 5 to 200 nm and further preferably 5 to 100 nm).

In addition, in such a textured structure of the organic silica thin film, the average bump part height (average dent part depth) is preferably equal to or greater than the average value of the distance between bump part walls, further preferably 20 to 1500 nm, and particularly preferably 50 to 500 nm. Note that the average bump part height (average dent part depth) is more preferably in a range about the same as the film thickness T to be described later. When such an average bump part height (average dent part depth) is less than the lower limit, there is a tendency to fail to sufficiently obtain the effect of increasing the surface area by formation of a textured structure. On the other hand, if the upper limit is exceeded, it tends to be difficult to desorb and vaporize molecules adsorbed deep in the gaps (inside the pore spaces in the case of pores) to the outside of the film even when the organic silica thin film is used for mass spectrometry and irradiated with a laser ray. Note that it is possible to obtain the average bump part height (average dent part depth) mentioned here as follows. An atomic force microscope (AFM) is used to measure the textured structure and obtain a cross-sectional view (vertical cross-sectional view) of the textured structure. For 100 or more randomly selected bump parts, the cross-sectional view is used to obtain the difference in height (distance in the vertical direction) of the top point of the bump part and the point located at the lowest position of the adjacent dent parts (lowest point of the dent parts). Finally, the average value thereof is calculated.

In addition, in such a textured structure, the average texture pitch is preferably 20 to 1000 nm, more preferably 20 to 500 nm, and further preferably 20 to 200 nm. When such an average texture pitch is less than the lower limit, it tends to be difficult to produce a textured structure with a high aspect ratio. On the other hand, when the upper limit is exceeded, there is a tendency to fail to sufficiently obtain the effect of increasing the surface area by formation of a textured structure. Such an average pitch employed is obtained as follows. An atomic force microscope (AFM) is used to measure the textured structure and obtain a cross-sectional view (vertical cross-sectional view) of the textured structure. For 100 or more randomly selected bump parts, the cross-sectional view is used to measure the horizontal distance between the bump part top points of the bump part and the nearest bump part (the central point of the upper portion of the bump part in the case where the cross-sectional shape of the bump part is a shape such as a substantial rectangle and the upper portion of the bump part is a line containing the bump part top point (for example the case where the bump part is in cylindrical shape and the upper portion is a surface)). Finally, the average of the measurement values is obtained.

Note that, when such a textured structure of the organic silica thin film is a textured structure formed of the pillar array in which the bump parts are formed of column-shaped bodies and the column-shaped bodies are arranged, the average length of the short axis of the column-shaped body is preferably 10 to 500 nm, more preferably 10 to 200 nm, and further preferably 10 to 150 nm. When such an average length of the short axis is less than the lower limit, it tends to be difficult to produce a textured structure with a high aspect ratio. On the other hand, when the upper limit is exceeded, there is a tendency to fail to sufficiently obtain the effect of increasing the surface area by formation of a textured structure. The length of such a short axis of the column-shaped body can be obtained as follows. An atomic force microscope (AFM) is used to measure the textured structure and obtain a cross-sectional view (vertical cross-sectional view) of the textured structure. The cross-sectional view is used to obtain the lengths of the short axes of 100 or more randomly selected column-shaped bodies and calculate the average thereof. Note that the short axis of the column-shaped body mentioned here refers to an axis which passes through the center of gravity of the column-shaped body and which is perpendicular to the longitudinal axis, and can be obtained based on the vertical cross-sectional view of the column-shaped body.

In addition, the thickness T of such an organic silica thin film is preferably 20 to 2000 nm, more preferably 50 to 1000 nm, and further preferably 100 to 500 nm. When such a thickness is less than the lower limit, there is a tendency to fail to sufficiently absorb the laser ray when used as a substrate for mass spectrometry, resulting in a decrease in the efficiency of ionization and desorption of measurement target molecules. On the other hand, when the upper limit is exceeded, the laser ray tends to fail to reach a deep portion of the thin film when used as a substrate for mass spectrometry, resulting in a decrease in the efficiency of ionization and desorption of measurement target molecules in the case where the measurement target molecules have been adsorbed to the deep portion.

Such an organic silica thin film of the present invention makes it possible to efficiently absorb light and also makes it possible to increase the surface area based on its textured structure, and thus is suitably applicable as a light absorption layer or a charge separation layer of a photoelectric conversion element, or an analysis substrate for laser desorption/ionization (LDI). Note that such an organic silica thin film may be used in the form of e.g. a layer stack stacked on other thin film or a substrate.

Hereinafter, description is provided for a method for producing an organic silica thin film of the present invention, which is suitably applicable as a method intended for producing such an organic silica thin film of the present invention.

(Method for Producing Organic Silica Thin Film)

A method for producing an organic silica thin film of the present invention comprises the step of obtaining an organic silica thin film by forming a textured structure by nanoimprinting in a film obtained from a sol solution obtained by partially polymerizing an organic silicon compound having a light absorbable organic group, followed by curing, wherein the organic silicon compound is an organic silicon compound which has an organic group having a local maximum absorption wavelength in a wavelength range of 200 to 1200 nm as a light absorbable organic group and in which a content ratio of silicon and the organic group is in a range of 0.05 to 0.50 based on a ratio of a mass of the silicon to a mass of the organic group ([mass of the silicon]/[mass of the organic group]), the organic silica thin film is a thin film comprising organic silica having a light absorbable organic group in a skeleton, the organic group in the thin film has a local maximum absorption wavelength in the wavelength range of 200 to 1200 nm, a content ratio of silicon and the organic group which constitute the organic silica is in a range of 0.05 to 0.50 based on a ratio of a mass of the silicon to a mass of the organic group ([mass of the silicon]/[mass of the organic group]), the thin film has a textured structure, and an axis direction of the textured structure is a direction substantially perpendicular to a surface opposite to a surface of the organic silica thin film having the textured structure formed therein.

The "organic silicon compound having a light absorbable organic group" used in such a method, which is an "organic silicon compound which has an organic group having a local maximum absorption wavelength in a wavelength range of 200 to 1200 nm as a light absorbable organic group and in which a content ratio of silicon and the organic group is in a range of 0.05 to 0.50 based on a ratio of a mass of the silicon to a mass of the organic group ([mass of the silicon]/[mass of the organic group])," is the same as the one described in the aforementioned organic silica thin film of the present invention (a preferable one thereof is also the same). Note that such an organic silicon compound is an organic silicon compound in which the content ratio of silicon and the organic group having a local maximum absorption wavelength in the wavelength range of 200 to 1200 nm is in the range of 0.05 to 0.50 (more preferably 0.10 to 0.40, further preferably 0.10 to 0.35, and particularly preferably 0.15 to 0.35) based on the mass of the silicon to the mass of the organic group ([mass of the silicon]/[mass of the organic group]). When such a ratio of the mass of the silicon to the mass of the organic group is less than the lower limit, the polycondensation reaction is suppressed due to the long average silicon-silicon distance, which reduces the cross-linking density and makes it difficult to sufficiently cure the film, resulting in a failure to form a textured structure by nanoimprinting. In addition, when such a ratio of the mass of the silicon to the mass of the organic group exceeds the upper limit, spatially close silicon atoms are considered to rapidly cause condensation reaction, which excessively increases the cross-linking degree in the stage of film formation, resulting in a failure to form a textured structure by nanoimprinting. Note that the present inventors presume as follows. Use of an organic silicon compound satisfying the above specific conditions on the ratio of the mass of the silicon ([mass of the silicon]/[mass of the organic group]) makes it possible to achieve an uncured or semi-cured state while suppressing the rapid progress of condensation reaction, and further to maintain the flexible uncured or semi-cured state at near room temperature. Therefore, it becomes possible to obtain an organic silica thin film comprising a cured film in which a textured structure is formed by nanoimprinting.

In addition, the sol solution (colloidal solution) used in the present invention is obtained by partially polymerizing the organic silicon compound having a light absorbable organic group. Except in the case of using the organic silicon compound, such a sol solution may be formed by employing a known method known as a so-called sol-gel method in the field of producing silica structural bodies. Note that such a sol solution is preferably a solution containing a partial polymer obtained by subjecting the organic silicon compound to partial hydrolysis and condensation reaction. The solvent used in such a solution is not particularly limited and a known solvent used in the so-called sol-gel method can be appropriately used, and examples thereof include organic solvents such as methanol, ethanol, n-propanol, isopropanol, acetone, tetrahydrofuran, N,N-dimethylformamide, 1,4-dioxane, and acetonitrile. Among such solvents, 1,4-dioxane and tetrahydrofuran are preferable from the viewpoint of volatility around room temperature and high solubility of the organic compound.

In addition, in the preparation of such a sol solution, there is no particular limitation on the various conditions for partially polymerizing the organic silicon compound (temperature and reaction time). Depending on the type of organic silicon compound used, for example, the reaction temperature may be about 0 to 100° C. and the reaction time may be about 5 minutes to 24 hours. In addition, it is preferable to use an acid catalyst from the viewpoint of efficiently promoting such partial polymerization. Examples of such an acid catalyst include mineral acids such as hydrochloric acid, nitric acid, and sulfuric acid. Note that the solution in the case of using such an acid catalyst is preferably acidic with a pH of 6 or less (more preferably 1 to 4).

The employed method for preparing such a sol solution may be a method for preparing a sol solution by, for example, preparing a solution containing the organic silicon compound, the solvent, and the acid catalyst and stirring the solution at room temperature (20 to 28° C., preferably 25° C.) for about 0.5 to 12 hours to partially polymerize the organic silicon compound (partial hydrolysis and partial polycondensation). Consider the case of stirring and reacting as described above. When the stirring time is less than the lower limit, there is a tendency that the hydrolysis reaction of silyl groups becomes insufficient, making difficult the progress of the curing reaction of the film after the film formation.

Note that the sol solution may be allowed to further contain other organic silicon compound than the organic silicon compound described above (for example, tetraalkoxysilanes such as tetramethoxysilane, tetraethoxysilane, and tetrabutoxysilane) as long as the organic silica thin film finally obtained can satisfy the aforementioned conditions.

In addition, regarding the sol solution, the content of the organic silicon compound in the solvent is preferably 0.2 to 20% by mass and more preferably 0.5 to 7% by mass. When the content of such an organic silicon compound is less than the lower limit, it tends to be difficult to produce a uniform film while controlling the thickness. On the other hand, when the upper limit is exceeded, it tends to be difficult to control the reaction in the sol solution, making it difficult to prepare a stable sol solution.

Moreover, regarding the sol solution, the content of the organic silicon compound in the solvent is preferably 2 to 200 g/L and more preferably 5 to 70 g/L. When the content of such an organic silicon compound is less than the lower limit, it tends to be difficult to produce a uniform film while controlling the thickness. On the other hand, when the upper limit is exceeded, it tends to be difficult to control the reaction in the sol solution, making it difficult to prepare a stable sol solution.

In addition, after the formation of the organic silicon compound by partial polymerization, such a sol solution is preferably used for film formation after filtration with a membrane filter or the like from the viewpoint of preventing contamination during production and ensuring higher smoothness.

In addition, there is no particular limitation on the method for forming the film obtained from the sol solution, and suitably employed is a method in which the sol solution is cast into a mold or a method in which the sol solution is coated on the substrate by various coating methods. Moreover, as such a coating method, it is possible to appropriately employ a known method (for example, a coating method using a bar coater, a roll coater, a gravure coater, or the like, or a method such as dip coating, spin coating, or spray coating). Such a substrate is not particularly limited as long as it can support the organic silica thin film, and examples appropriately usable include known substrates which can be used for producing silica films, such as silicon substrates (Si substrates), ITO substrates, FTO substrates, quartz substrates, glass substrates, and various metal substrates. There is no particular limitation on the form of such substrates, but it is preferably a flat plate shape. Note that such a substrate can be used as it is as the substrate 1 in the layer stack (multi-layer structural body) illustrated in aforementioned FIG. 1. As described above, depending on the usage, the organic silica thin film of the present invention can be appropriately used as a multi-layer structural body including the substrate and the organic silica thin film, and the type of the substrate may be appropriately selected depending on its usage.

In addition, the thickness of the film (uncured or semi-cured) obtained from such a sol solution is preferably 0.1 to 100 μm and more preferably 0.1 to 25 μm. When such a film thickness is less than the lower limit, it tends to be difficult to keep the film thickness evenly over the entire surface of the substrate. On the other hand, when the upper limit is exceeded, there is a tendency that unevenness easily produces in the film thickness due to flow and liquid dripping.

Moreover, the film (uncured or semi-cured) obtained from such a sol solution may be subjected to a treatment of removing the solvent in advance prior to the formation of the textured structure by nanoimprinting from the viewpoint of minimizing the influence of structural contraction due to evaporation of the solvent. In the case of such a treatment for removing the solvent, the method employed is not particularly limited and may be a known method, and examples thereof include a method in which a film composed of the sol solution is allowed to stand for about 1 minute to 12 hours under a temperature condition of 15 to 35° C. In the case of employing the method of heating in the curing step to be described later, the solvent may be removed during heating. In addition, in the film obtained from such a sol solution, there is a case where the solvent is almost evaporated (volatilized) in the step of forming a film (coating step and the like) depending on the type of the solvent of the sol solution. In that case, it is possible to minimize the influence of structural contraction due to evaporation (volatilization) of the solvent even without a particular treatment of removing the solvent.

As described above, the film (uncured or semi-cured) obtained from the sol solution according to the present invention is not particularly limited as long as it is a film obtained by using a sol solution. For example, a coat film obtained by coating a sol solution (which may be a film having the solvent remaining therein or a film from which the solvent has been removed by volatilization in the step of forming that film (coating step and the like)) may be used as it is. Moreover, it is possible to use an uncured or semi-cured film or the like obtained by subjecting a coat film or the like of a sol solution to the treatment of removing the solvent as described above. Note that the film obtained from the sol solution is preferably a film from which the solvent has been removed (which may be a film subjected to the treatment for removing the solvent described above or a film obtained by using a volatile solvent to volatilize (remove) the solvent in the coating step) so as to minimize in the nanoimprinting step the influence of structural contraction due to evaporation of the solvent.

In addition, in the present invention, a textured structure is formed by nanoimprinting in the film (uncured or semi-cured film) obtained from the sol solution, followed by curing. Note that, as the "nanoimprinting" mentioned here, it is possible to appropriately employ a known technique known as a so-called nanoimprinting method, and it is possible to appropriately employ a method (nanoimprinting method) in which a mold (nanostructural body) having a fine textured pattern formed therein is used to transcribe the mold pattern.

Note that it was conventionally impossible to produce an organic silica thin film having a textured structure by nanoimprinting. However, in the present invention, nanoimprinting is carried out on a film (uncured or semi-cured film) obtained from a sol solution obtained by using the aforementioned specific organic silicon compound. Thus, it becomes possible to sufficiently fill the textured structure of the nanomold with an organic silicon compound. The present inventors presume that this makes it possible to form a cured film in which a textured structure is formed by nanoimprinting.

As a mold used for such nanoimprinting, a mold usable in a known nanoimprinting method can be appropriately used, and a commercially available product may be used. In addition, as such a mold (nanostructural body), a nanostructural body having a fine textured pattern formed therein may be used as it is. In addition, as a mold (nanostructural body), it is possible to use a nanoimprinting transcription product formed by transcribing (inverting) the textured pattern of the nanostructural body directly usable as a mold. Furthermore, as a mold (nanostructural body), it is possible to use a structural body formed by further transcribing (inverting) the textured pattern using the nanoimprinting transcription product. Anything can be appropriately used as long as a desired textured structure is formed.

As a mold used for such nanoimprinting, preferable is one having such a textured structure that the axis direction of the textured structure of the organic silica thin film formed is a direction substantially perpendicular to the surface opposite to the surface of the organic silica thin film having a textured structure formed therein. Use of such a mold makes it possible to transcribe the characteristics of the mold and to efficiently produce an organic silica thin film having such a textured structure that the axis direction of the textured structure is a direction substantially perpendicular to the surface opposite to the surface of the thin film having the textured structure formed therein. For example, consider the case of using as a mold a flat plate having a textured structure formed therein. When the textured structure of the mold is such that the axis direction of the textured structure is a direction substantially perpendicular to the surface opposite to the surface of the flat plate having the textured structure formed therein, it is possible to more efficiently achieve a situation where, when the textured pattern of the mold is transcribed, the axis direction of the textured structure formed in the organic silica thin film is a direction substantially perpendicular to the surface opposite to the surface of the organic silica thin film having a textured structure formed therein.

In addition, the textured structure of the mold used in such nanoimprinting is preferably a textured structure formed of the pillar array in which the bump parts are formed of column-shaped bodies and the column-shaped bodies are arranged or a textured structure in which the dent parts are formed of column-shaped pores. Note that, since the textured structure of such a mold is used for the purpose of transcribing (inverting) the characteristics of the textured structure by nanoimprinting to form a textured structure in the organic silica thin film, the suitable conditions for the textured structure are the same as the various conditions described in the textured structure of the aforementioned organic silica thin film (for example, average pore diameter, average pitch, and the like).

In addition, the employed method for forming a textured structure by nanoimprinting followed by curing is preferably a method in which a mold is mounted on the surface of a film obtained from the sol solution so as to transcribe (invert) the characteristics of the texture formed in the mold, and then the film obtained from the sol solution is heated for curing with the mold mounted thereon. The film obtained from such a sol solution can be cured by further promoting the hydrolysis and condensation reaction of the organic silicon compound and/or the partial polymer of the organic silicon compound. For this reason, depending on the type of the organic silicon compound used, one may appropriately employ such conditions for the curing by heating that allow progress of its hydrolysis and condensation reaction. Although there is no particular limitation on the temperature, heating time, and the like, it is preferable to carry out heating at a temperature of about 25 to 150° C. for about 1 to 48 hours. In this way, heating with the mold mounted so as to transcribe the texture makes it possible to obtain a cured film whose surface has a structure with inverted (transcribed) characteristics of the texture of the mold.

In this way, when the nanoimprinting method is employed to transcribe the texture for curing, it is possible to obtain an organic silica thin film which is a thin film comprising organic silica having a light absorbable organic group in a skeleton, in which the organic group in the thin film has a local maximum absorption wavelength in the wavelength range of 200 to 1200 nm, a content ratio of silicon and the organic group which constitute the organic silica is in a range of 0.05 to 0.50 based on a ratio of a mass of the silicon to a mass of the organic group ([mass of the silicon]/[mass of the organic group]), the thin film has a textured structure, and an axis direction of the textured structure is a direction substantially perpendicular to a surface opposite to a surface of the organic silica thin film having the textured structure formed therein. As described above, the present invention makes it possible to efficiently obtain the organic silica thin film of the present invention. Note that such an organic silica thin film obtained by the present invention is a film comprising a polymer of the organic silicon compound. In addition, such an organic silica thin film can be obtained as one stacked on a substrate when the film obtained from the sol solution is one formed by coating on the substrate. In that case, depending on the usage, it may be used as a layer stack (multi-layer structural body) as it is, or only the organic silica thin film may be peeled from the layer stack for use.

Such a method for producing an organic silica thin film of the present invention makes it possible to form a textured structure in the obtained organic silica thin film by a simple method such as nanoimprinting and to easily form a textured structure depending on the usage. As described above, in the present invention, it is possible to easily and reproducibly produce a textured structure in an organic silica thin film by nanoimprinting treatment, and the textured structure is formed such that the axis direction thereof is oriented substantially perpendicularly to the surface opposite to the surface having the textured structure formed therein. Therefore, the textured structure formed in the organic silica thin film is a porous structure suitable for laser desorption and ionization. As described above, depending on the origin of the textured structure, the organic silica thin film obtained by the present invention is suitably applicable to analysis substrates for a laser desorption/ionization mass spectrometric method, charge separation layers of photoelectric conversion elements, and the like. In addition, since the method for producing an organic silica thin film of the present invention is a method which does not use a surfactant, the organic silica thin film obtained has no residues of the surfactant. It can be said also from this viewpoint that suitable application to a laser desorption/ionization mass spectrometric method is possible. In addition, since the method for producing an organic silica thin film of the present invention makes it possible to easily and reproducibly produce a textured structure in an organic silica thin film by nanoimprinting treatment, it is suitably applicable as a method fitted also for increasing the area of and mass production of organic silica thin film.

As described above, the organic silica thin film obtained by the present invention makes it possible to more efficiently and more accurately carry out mass spectrometry because, for example, the axis direction of the textured structure formed in the surface is oriented substantially perpendicularly to the surface opposite to the surface having the textured structure formed therein and the thin film has no residues of the surfactant. Therefore, it is suitably applicable to analysis substrates for laser desorption/ionization (LDI).

[Laser Desorption/Ionization Mass Spectrometric Substrate]

A laser desorption/ionization mass spectrometric substrate of the present invention is a substrate used for a laser desorption/ionization mass spectrometric method, the substrate comprising the organic silica thin film of the present invention.

As described above, in the laser desorption/ionization mass spectrometric substrate of the present invention, the organic silica thin film of the present invention is used in a substrate (analysis substrate) for laser desorption/ionization mass spectrometry. The form of the substrate (analysis substrate) comprising the organic silica thin film of the present invention as such an analysis substrate is not particularly limited, and may be, for example, one composed only of the organic silica thin film or may be used as a form in which the organic silica thin film is stacked on a support (for example, the substrate 1) (for example, a layer stack in which the organic silica thin film is stacked on a substrate used during production). Moreover, the form (usage form) in the case of using an analysis substrate comprising the organic silica thin film of the present invention is preferably the form of a layer stack in which the organic silica thin film is stacked on the substrate (for example, an organic silica thin film is formed on the substrate for use as it is) from the viewpoint of ease of preparation and the like.

In addition, as the organic silica thin film of the present invention used for such mass spectrometry, one may select and use the type of the light absorbable organic group in the organic silica thin film such that the organic group is an organic group which can absorb an irradiation laser ray depending on the type of laser ray used. As described above, the light absorbable organic group in the organic silica thin film included in the analysis substrate is preferably an organic group which can absorb an irradiation laser ray (more preferably an organic group having an absorption local maximum wavelength in a range of 200 to 600 nm). Note that description is provided later for the specific method for a laser desorption/ionization mass spectrometric method.

[Laser Desorption/Ionization Mass Spectrometric Method]

A laser desorption/ionization mass spectrometric method of the present invention is a method comprising the step of:
carrying out mass spectrometry by
using a substrate comprising the organic silica thin film of the present invention as an analysis substrate,
allowing the organic silica thin film to support a sample containing measurement target molecules, and
irradiating a sample supporting portion of the film with a laser ray to ionize the measurement target molecules.

The present invention uses a substrate including the organic silica thin film of the present invention as the analysis substrate. Such an analysis substrate is the same as the laser desorption/ionization mass spectrometric substrate of the present invention.

In addition, the sample according to the present invention contains measurement target molecules. Although such measurement target molecules are not particularly limited, they are preferably molecules derived from a living body or molecules in a living body sample because the present invention enables measurement with higher detection sensitivity. Such molecules derived from a living body or molecules in a living body sample are more preferably sugars, proteins, peptides, glycoproteins, glycopeptides, nucleic acids, and glycolipids. There is a tendency that the effects of the present invention can be higher for these molecules. In addition, such measurement target molecules may be ones prepared from natural products, ones prepared by partially modifying a natural product chemically or enzymatically, and ones prepared chemically or enzymatically. In addition, they may be ones having a partial structure of molecules contained in a living body or ones prepared by mimicking molecules contained in a living body.

In addition, the sample according to the present invention (sample containing the measurement target molecules) may be the measurement target molecules themselves or ones containing the measurement target molecules (such as living body tissues, cells, body fluids, and secretions (for example, blood, serum, urine, semen, saliva, tears, sweat, feces, and the like)). As described above, it is possible to directly use a living body sample as the sample according to the present invention (sample containing the measurement target molecules). In addition, the measurement target molecules may be prepared by allowing the organic silica thin film to support a precursor of the sample (such as a precursor of the measurement target molecules), followed by enzyme treatment. In this case, when the treatment is carried out after the sample precursor is supported on the organic silica thin film, the sample is eventually supported on the organic silica thin film.

In addition, the aforementioned "measurement target molecules" may be molecules themselves which are contained in the sample and whose chemical structure is desired to be determined, or molecules which are contained in the sample and which are obtained by derivatizing the molecules whose chemical structure is desired to be determined (for example, molecules subjected to mass spectrometry, which are obtained by binding so-called labelled molecules to molecules whose chemical structure is desired to be determined). As described above, the "measurement target molecule" may be underivatized molecules or molecules derivatized with labelled molecules. Note that the presence or absence of derivatization is not particularly limited, and may be appropriately determined depending on the type of the organic group of the organic silica thin film to be used, the type of molecules whose chemical structure is desired to be determined, and the like. As described above, derivatization is not always necessary depending on the molecules whose chemical structure is desired to be determined. Note that although the molecular weight of such measurement target molecules is not particularly limited, it is preferably 160 or more, more preferably 500 or more, and particularly preferably 1000 or more because it is difficult to accurately carry out measurement by other measurement methods and it is easy to exhibit the characteristics of the present invention.

In addition, in the case of using molecules obtained by derivatizing the molecules whose chemical structure is desired to be determined as the measurement target molecules, the derivatization is preferably carried out by covalent bonding with labelled molecules which enable acceptance of optical energy absorbed by the organic group (optical energy absorbed by the organic silica thin film) and preferably with labelled molecules having an absorption band with a spectral overlap with the light emission spectrum of the organic silica thin film.

Such labelled molecules used are not particularly limited as long as they have an effect as a receptor of energy supplied from the organic silica thin film, and may be molecules commercially available as fluorescent label reagents. Examples of such labelled molecules include pyrene derivatives, fluorescein derivatives, rhodamine derivatives, cyanine dyes, Alexa Fluor (registered trademark), 2-aminoacridone, and 6-aminoquinoline.

In addition, the combination of the organic silica thin film, an energy supplier, and the labelled molecules, energy receptors, is appropriately determined from the viewpoint of the efficiency of energy transfer, the overlap between the light emission spectrum of the organic silica thin film and the absorption spectrum of the measurement target molecules, the intensity of interaction, and the like. For example, in the case of using a cross-linked type organic silica thin film having a triphenylamine group as the organic silica thin film, it is possible to suitably use, as the labelled molecule, 2-aminoacridone and the like. In addition, in the case of using a cross-linked type organic silica thin film having a methyl acridone group as the organic silica thin film, it is possible to suitably use, as the labelled molecule, 4-Fluoro-7-nitrobenzofurazan, 4-Fluoro-7-sulfobenzofurazan, 3-Chlorocarbonyl-6,7-dimethoxy-1-methyl-2(1H)-quinoxalinone, and the like. Such labelled molecules preferably have a functional group which chemically bonds easily to the target molecules, and the derivatization may be carried out in other container or on the organic silica thin film.

Note that, although it is not exactly clear why it becomes possible to more efficiently ionize the measurement target molecules by using a substrate including the organic silica thin film as an analysis substrate, the present inventors presume as described below. Specifically, first, when the organic silica thin film according to the present invention is irradiated with a laser ray, the organic group in the film absorbs the laser ray. When the laser ray is absorbed in this way, it becomes possible to transfer the optical energy absorbed by the organic silica thin film to the measurement target molecules (energy receptors). As described above, when irradiated with a laser ray, the organic silica thin film according to the present invention acts as an energy supplier which transfers the optical energy to the measurement target molecules (energy receptors). Note that such energy transfer from the organic silica thin film (energy supplier) to the measurement target molecules (energy receptors) is conceivably energy transfer not via light emission (for example, transfer of excited energy between molecules, electron transfer, or transfer as thermal energy) and energy transfer via light emission (for example, energy transfer in which the measurement target molecules absorb the light emitted from the organic group of the organic silica thin film having absorbed a laser ray (energy transfer by light emission reabsorption)). Then, the present inventors presume that such energy transfer makes it possible to more efficiently ionize the measurement target molecules by using a laser ray. In addition, the present invention uses a substrate comprising the organic silica thin film of the present invention as the analysis substrate, and the thin film has a textured structure formed therein. Plus, the textured structure is such that the axis direction thereof is oriented in a direction substantially perpendicular to the surface opposite to the surface of the organic silica thin film having the textured structure formed therein. Additionally, the present inventors presume that since the textured structure having such an orientation characteristic can be said to have such a structure that more efficient laser desorption and ionization of the measurement target molecules are possible, the present invention makes it possible to carry out more efficient ionization with the characteristic of the textured structure while using the energy transfer as mentioned earlier, making it possible to carry out more efficient and more accurate mass spectrometry. Moreover, the present inventors presume that since the present invention makes it possible for the organic silica thin film to form a textured structure without using a surfactant during production, it is possible to more efficiently reduce the risk that the residues of the surfactant could appear as an unnecessary peak, making it possible to obtain a higher analysis performance.

In addition, in the present invention, since such energy transfer is considered to make it possible to more efficiently ionize the measurement target molecules by using a laser ray, it is preferable to select the measurement target molecules and the organic group so as to satisfy the following relationships. Specifically, whatever the energy transfer (energy transfer from the organic silica thin film (energy supplier) to the measurement target molecules (energy receptors)) is, from the viewpoint of more efficiently enabling energy transfer, it is more preferable to select the organic group and the measurement target molecules such that there is at least an overlap at one certain wavelength between the optical spectrum emitted from the organic group of the organic silica thin film and the absorption spectrum of the measurement target molecules after the organic group in the organic silica thin film absorbs an irradiation laser ray. As described above, when there is at least an overlap at one certain wavelength between the light emission spectrum from the organic group and the absorption spectrum of the measurement target molecules, the optical energy absorbed by the organic silica thin film or the excited energy of the organic silica thin film tends to more efficiently transfer to the measurement target molecules. Particularly in the case of energy transfer via light emission, the organic silica thin film absorbs an irradiation laser ray to emit light, and there is more preferably at least an overlap at one certain wavelength between the light emission spectrum of the organic silica thin film (light emission spectrum from the organic group) and the absorption spectrum of the measurement target molecules. This is because the optical energy exiting the organic silica thin film by such light emission tends to efficiently transfer to the measurement target molecules.

In addition, whatever form the energy transfer has (whether via light emission or not via light emission), there is more preferably at least an overlap at one certain wavelength between the light emission spectrum of the organic silica thin film and the absorption spectrum of the measurement target molecules due to the position of the short wavelength end of the light emission spectrum of the organic silica thin film located on the short wavelength side of the long wavelength end of the absorption spectrum of the measurement target molecules. In that case, the optical energy absorbed by the organic silica thin film tends to more efficiently transfer in the form of optical energy or excited energy to the measurement target molecules.

In mass spectrometry, the laser desorption/ionization mass spectrometric method of the present invention first allows the organic silica thin film to support a sample containing the measurement target molecules. There is no particular limitation on such a method for supporting a sample. For example, it is preferable to employ a method which places a sample on a face (surface) of the organic silica thin film having the textured structure formed therein to support the sample on the film. In this way, when a sample is placed on a surface of the organic silica thin film having the textured structure formed therein, the sample easily penetrates into the inside of the pores, making it possible to efficiently support the sample on the organic silica thin film. For example, consider the case of preparing an aqueous solution containing the measurement target molecules. When the aqueous solution is coated or added dropwise on a surface of the organic silica thin film having the textured structure formed therein to place a sample precursor (aqueous solution) on the organic silica thin film followed by dry-removal of water being a solvent, it is possible to support a sample on the film (in this example, the measurement target molecules themselves that remain after removal of water are the sample supported on the organic silica thin film). In addition, as mentioned earlier, one may eventually support a sample containing the measurement target molecules (enzyme treated products) on the organic silica thin film by supporting a sample precursor (molecules before enzyme treatment) on the organic silica thin film to prepare the measurement target molecules (enzyme treated products) on the film. As described above, the method for supporting a sample is not particularly limited as long as it is possible to eventually support a sample containing the measurement target molecules (such as measurement target molecules themselves, derivatized products of measurement target molecules, and mixtures of measurement target molecule and standard substances) on the organic silica thin film.

The present invention allows the organic silica thin film to support a sample containing the measurement target molecules as described above and then irradiates the sample supporting portion of the film with a laser ray to ionize the measurement target molecules, thus carrying out mass spectrometry.

Examples of a laser ray source used in such mass spectrometry include, but not limited to, laser ray sources such as nitrogen lasers (337 nm), YAG laser third harmonic waves (355 nm), Nd YAG lasers (256 nm), and carbon dioxide gas lasers (9400 nm, 10600 nm), and laser ray sources of nitrogen lasers or YAG laser third harmonic waves are preferable from the viewpoint that they are laser ray sources of a wavelength which allows the organic silica thin film to efficiently absorb light.

In addition, the present invention uses the laser ray source (for example, a source of nitrogen laser) to irradiate the sample supporting portion of the organic silica thin film with a laser ray. In this way, irradiation of the sample supporting portion with a laser ray makes it possible to ionize the measurement target molecules. Note that the present inventors presume the mechanism of ionization is, as already described, such that the organic group present at the laser irradiation site absorbs the irradiation laser, and the absorbed optical energy efficiently transfers to the measurement target molecules. In addition, the present invention uses the organic silica thin film of the present invention as the analysis substrate and supports a sample on a face (surface) of the film having the textured structure formed therein. For this reason, in the case of, for example, adding the sample dropwise for supporting, the measurement target molecules added dropwise are efficiently introduced to the inside of the thin film and supported on the film in a state that more facilitates reception of optical energy absorbed by the organic group of the organic silica thin film. The present inventors presume that laser irradiation promotes ionization desorption, making it possible to carry out mass spectrometry at a higher detection sensitivity.

Note that the laser ray irradiation conditions (irradiation intensity, irradiation time, and the like) are not particularly limited, and optimum conditions may be appropriately selected from known mass spectrometry conditions and set depending on the measurement target molecules.

In addition, an ion separation detection method for mass spectrometry is not particularly limited, and it is possible to appropriately employ the double focusing method, the quadrupole focusing method (quadrupole (Q) filter method), the tandem quadrupole (QQ) method, the ion trap method, the time of flight (TOF) method, and the like. These make it possible to separate and detect ionized molecules according to the mass/charge ratio (m/z). Note that it is possible to appropriately use a commercially available apparatus for such separation and detection of ions, and examples thereof which can be appropriately used include a mass spectrometer manufactured by Bruker Daltonics (trade name "autoflex" and the like) and an ion trap time-of-flight type mass spectrometer manufactured by Shimadzu Corporation (trade name "AXIMA-QIT" and the like). In this way, it is possible to carry out mass spectrometry on ionized measurement target molecules.

Such a laser desorption/ionization mass spectrometric method of the present invention uses the organic silica thin film of the present invention as the analysis substrate, and the textured structure formed in the this film is such that the axis direction thereof is a direction substantially perpendicular to the surface opposite to the surface of the organic silica thin film having the textured structure formed therein. Plus, since the textured structure has such a structure that more efficient laser desorption and ionization of the measurement target molecules are possible, the present inventors presume that the present invention makes it possible to carry out more efficient and more accurate mass spectrometry. In addition, the present inventors presume that, in the case of using the organic silica thin film of the present invention as the analysis substrate, it is unnecessary to use a sample prepared by mixing a matrix (low molecular organic substance) in the measurement target molecules (analysis target compound) (it is unnecessary to add a matrix), which means that no peak originating from the matrix is detected, making it possible to carry out more accurate mass spectrometry.

Examples

Hereinafter, the present invention is described more specifically based on Examples and Comparative Examples, but the present invention is not limited to the following examples.

Example 1

A compound represented by the following general formula (A):

[Chem. 6]

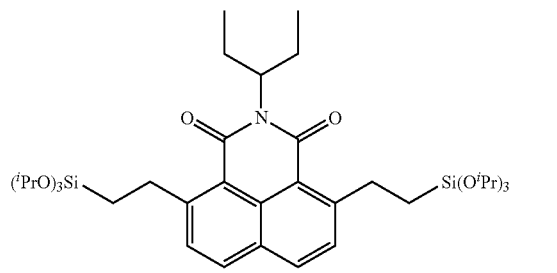

(A)

(in the formula (A), the group represented by $^{i}Pr$ represents an isopropyl group)

(80 mg, ratio of [mass of the silicon]/[mass of the organic group]: 0.174 [compound having a silicon mass ratio of 17.4% by mass]: note that the "organic group" mentioned here refers to a residue obtained by removing from the general formula (A) two groups represented by the formula: —Si(O$^{i}$Pr)$_3$) was dissolved in 1,4-dioxane (1.5 mL) to obtain a mixture solution, followed by addition of 2 M (mol/L) hydrochloric acid (15 μL) in the mixture solution for stirring at room temperature for 2 hours to prepare a sol solution. Next, the obtained sol solution was filtered with a membrane filter, and then the filtered sol solution was spin-coated ([coating condition] employed the condition of continuously increasing the rotation speed from 0 rpm to 1200 rpm over 10 seconds and maintained the rotation at 1200 rpm for 5 seconds) on a silicon substrate to form an uncured organic silica thin film (film thickness: 200 to 300 nm) on the silicon substrate. Note that, regarding the film obtained from the sol solution (uncured organic silica thin film) as described above, most of (almost all of) the solvent evaporated (volatilized) during the spin coating. As described above, it was difficult to obtain an accurate film thickness of the coat film since most of the solvent was removed by evaporation during film formation. However, atomic force microscope (AFM) observation of the film immediately after film formation showed that the film thickness was in a predetermined range (range of 200 to 300 nm).

Next, a nanomold made of polyethylene terephthalate (trade name "FleFimo" manufactured by Soken Chemical & Engineering Co., Ltd., nanopillar array, pitch 250 nm, pillar diameter 150 nm, and pillar height 250 nm) was used as a mold (nanomold) for nanoimprinting, and the nanomold was pressed against the surface of the thin film (uncured organic silica thin film) immediately after spin coating formed on the silicon substrate as mentioned earlier, and the nanomold was immobilized with a double clip. In this way, while pressing the nanomold against the surface of the thin film, heat treatment was carried out at 80° C. for 72 hours to cure the thin film, followed by removal of the nanomold to form an organic silica thin film (film thickness: 250 nm).

[Evaluation of Characteristics of Organic Silica Thin Film Obtained in Example 1]

For the purpose of measuring the absorption wavelength of the organic group in the organic silica thin film obtained in Example 1, a sample was formed to measure the ultraviolet/visible absorption spectrum as described below. Specifically, first, a sol solution was prepared in the same manner as that of Example 1 and filtered with a membrane filter, and the filtered sol solution was used for spin coating ([coating condition] employed the condition of continuously increasing the rotation speed from 0 rpm to 1200 rpm over 10 seconds and maintained the rotation at 1200 rpm for 5 seconds) to form an uncured organic silica thin film (film thickness: 200 to 300 nm) as a sample on a quartz substrate. FIG. 3 illustrates the ultraviolet/visible absorption spectrum of such a sample. Note that, as is apparent from the ultraviolet/visible absorption spectrum illustrated in FIG. 3, the organic group in the polymer of the compound (organic silicon compound) represented by the general formula (A) showed absorption local maximum wavelengths at 243 nm, 344 nm, and 354 nm, and it was revealed that the organic group in the organic silica thin film obtained in Example 1 was light absorbable.

In addition, the state of the textured structure of the organic silica thin film obtained in Example 1 was measured with an atomic force microscope (AFM). FIG. 4 illustrates the obtained atomic force microscope (AFM) image. As is apparent from the AFM image illustrated in FIG. 4, it was revealed that there formed was a regular porous structure (pore structure) on which the structure of the nanomold had been transcribed. Note that such AFM measurement was carried out for several sites by changing the measurement sites. The measurement results were used to obtain cross-sectional views (vertical cross-sectional views), and the cross-sectional views were used to measure the axis directions of 100 randomly selected textured structures (directions of the longitudinal axes of the pores). It was revealed that all of the axis directions of the textured structures measured were at angles in a range of 90°±20° with respect to the surface opposite to the surface of the organic silica thin film having the textured structure formed therein and that the axis directions of the textured structure were oriented substantially perpendicularly to the surface opposite to the surface of the organic silica thin film having the textured structure formed therein.

In addition, the results of such AFM measurement were used to obtain cross-sectional views (vertical cross-sectional views), to measure the distance between the centers (between the top points) of nearest bump parts for 100 randomly selected bump parts, and to obtain the average texture pitch (average pitch of pores) from the average thereof, and it was revealed that the average texture pitch of the organic silica thin film was 250 nm. Moreover, the cross-sectional views obtained by AFM measurement were used to measure the inter-wall distance (horizontal distance) between a bump part and the nearest bump part at a position with a height half the average height to be described later for 100 randomly selected bump parts (note that, in the measurement of the inter-wall distance (horizontal distance), the height position reference (position of height 0 nm) for each of the bump parts randomly selected for the purpose of measuring the inter-wall distance was the lowest point of the dent part between that bump part and the nearest bump part), to measure the average thereof, and to measure the average value of the distance between bump part walls (average pore diameter), and it was revealed that the average value of the distance between bump part walls of the textured structure of the organic silica thin film was 150 nm. In addition, the cross-sectional views obtained by AFM measurement of the organic silica thin film were used to obtain the average bump part height (average pore (dent part) depth) for 100 randomly selected textured structures, and it was revealed that the average value of the height (dent part depth) of the bump part was 220 nm.

Furthermore, the state of the textured structure of the organic silica thin film obtained in Example 1 was measured with a scanning electron microscope (SEM). FIG. 5 illustrates the obtained scanning electron microscope (SEM) image. Such SEM measurement was carried out at several sites by changing the measurement sites. The measurement results (SEM images) were also used to measure the axis directions of 100 randomly selected textured structures (directions of the longitudinal axes of the pores). It was revealed that all of the axis directions of the textured structures measured were at angles in a range of 90°±20° with respect to the surface opposite to the surface of the organic silica thin film having the textured structure formed therein and also from such measurement that the axis directions of the textured structure were oriented substantially perpendicularly to the surface opposite to the surface of the organic silica thin film having the textured structure formed therein.

Note that the AFM measurement and the SEM measurement were carried out for several times by changing the measurement sites as mentioned earlier, and the same structures were observed at any of the measurement sites, revealing that a homogeneous nanoporous structure was formed within the region pressed by the nanomold.

What is more, from the type of the raw material compound used, the mass ratio of the silicon to the organic group (light absorbable organic group) constituting the organic silica thin film obtained in Example 1 ([mass of the silicon]/[mass of the organic group]) was clearly 0.174.

Example 2

The organic silica thin film obtained in Example 1 was used as an analysis substrate to be used in the laser desorption/ionization mass spectrometric method to carry out laser desorption/ionization mass spectrometry (LDI-MS). Note that the organic silica thin film obtained in Example 1 used was stacked on a silicon substrate. In such laser desorption/ionization mass spectrometry (LDI-MS), angiotensin I was first selected as a measurement target molecule to prepare an aqueous solution of angiotensin I (concentration of angiotensin I: 0.5 pmol/μL, containing 0.1% by mass of trifluoroacetic acid), and the aqueous solution of angiotensin I was coated in an amount of 1 μL on the surface of the organic silica thin film having the textured structure formed therein to allow the organic silica thin film to support a sample (angiotensin I). Next, an MALDI-TOF-MS apparatus (wavelength of the irradiation laser ray: 337 nm) was used to irradiate the organic thin film supporting the sample (angiotensin I) with a laser ray having a wavelength of 337 nm, thereby carrying out laser desorption/ionization mass spectrometry (LDI-MS). FIG. 6 illustrates a graph of mass spectrum (LDI-MS spectrum) as the results of such analysis.

As is apparent from the mass spectrum (LDI-MS spectrum) illustrated in FIG. 6, such laser desorption/ionization mass spectrometry (LDI-MS) made it possible to clearly detect a peak (signal) of the mass spectrum at the position of m/z=1297. Note that such a peak at the position of m/z=1297 corresponds to angiotensin I. As described above, it was revealed that the laser desorption/ionization mass spectrometric method using the organic silica thin film of the present invention (Example 1) made it possible to clearly detect a signal (m/z=1297) corresponding to angiotensin I without using a matrix.

Example 3

Laser desorption/ionization mass spectrometry (LDI-MS) was carried out in the same manner as that in Example 2 except that the concentration of the aqueous solution of angiotensin I was changed from 0.5 mol/μL to 0.1 mol/μL. FIG. 7 illustrates a graph of mass spectrum (LDI-MS spectrum) as the results of such analysis.

As is apparent from the mass spectrum (LDI-MS spectrum) illustrated in FIG. 7, such laser desorption/ionization mass spectrometry (LDI-MS) made it possible to clearly detect a peak (signal) of the mass spectrum at the position of m/z=1297. Note that such a peak at the position of m/z=1297 corresponds to angiotensin I. As described above, it was revealed that the laser desorption/ionization mass spectrometric method using the organic silica thin film of the present invention (Example 1) made it possible to clearly detect a signal (m/z=1297) corresponding to angiotensin I without using a matrix.

Example 4

<Step of Preparing Nanomold>

First, polydimethylsiloxane (PDMS) and ultraviolet curable type liquid silicone rubber (KER-4690-A/B manufactured by Shin-Etsu Chemical Co., Ltd.) were mixed at a mass ratio of 1:1 to prepare a polydimethylsiloxane precursor solution (PDMS precursor solution). Next, the PDMS precursor solution (50 μL) was added dropwise on the textured surface of the nanoimprinting nickel standard mold (trade name "Kokuou" manufactured by Soken Chemical & Engineering Co., Ltd.; nanopillar array, pitch 250 nm, pillar diameter 150 nm, and pillar height 250 nm) to form a coat film of PDMS precursor solution, and quartz glass was mounted on the coat film, which was kept for 2 minutes with the quartz glass mounted thereon to obtain a layer stack sandwiching the coat film between the nanoimprinting nickel standard mold and the quartz glass. After that, the layer stack was set on a UV type imprinting apparatus (Engineering System Co., Ltd., model EUN-4200) and irradiated with UV light at 375 nm for 30 minutes to cure the coat film of the PDMS precursor solution. Thereafter, the nanoimprinting nickel standard mold was removed to obtain a PDMS mold (transcription structural body: nanomold) which had a thin film stacked on the quartz glass (quartz substrate), the thin film having a textured structure and composed of a PDMS polymer. Note that the state of the textured structure of the nanomold (transcription structural body) obtained in this way was measured with an atomic force microscope (AFM). FIG. 8 illustrates the obtained atomic force microscope (AFM) image. As is apparent from the results (AFM image) illustrated in FIG. 8, it was revealed that the textured structure of the PDMS mold (transcription structural body: nanomold) was a nanohole array structure (porous structure) reflecting the structure of the nickel standard mold. Note that such AFM measurement was carried out for several sites by changing the measurement sites. The measurement results were used to obtain cross-sectional views (vertical cross-sectional views), to measure the distance between the centers (between the top points) of nearest bump parts for 100 randomly selected bump parts, and to obtain the average texture pitch (average pitch of pores) from the average thereof, and it was revealed that the average texture pitch of the nanomold was 250 nm. Moreover, the cross-sectional views obtained by AFM measurement were used to measure the inter-wall distance (horizontal distance) to the nearest bump part at a position with a height half the average height for 100 randomly selected bump parts, to measure the average thereof, and to obtain the average value of the distance between bump part walls (average pore diameter), and it was revealed that the average value of the distance between bump part walls of the textured structure of the nanomold was 120 nm. In addition, the cross-sectional views obtained by AFM measurement of the nanomold were used to obtain the average bump part height (average pore (dent part) depth) for 100 randomly selected textured structures, and it was revealed that the average value of the height (dent part depth) of the bump part was 110 nm. Furthermore, the cross-sectional views obtained by AFM measurement of the nanomold were used to measure the axis directions of 100 randomly selected textured structures (directions of the longitudinal axes of the pores). It was revealed that all of the axis directions of the textured structures measured were at angles in a range of 90°±20° with respect to the surface opposite to the surface of the nanomold having the textured structure formed therein and that the axis directions of the textured structure were oriented substantially perpendicularly to the surface opposite to the surface of the nanomold having the textured structure formed therein.

<Preparation of Organic Silica Thin Film>

A compound represented by the following general formula (B):

[Chem. 7]

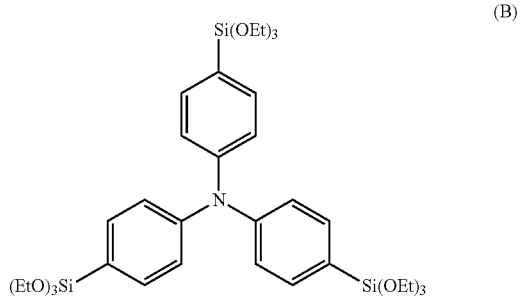

(B)

(in the formula (B), the group represented by Et represents an ethyl group)

(30 mg, ratio of [mass of the silicon]/[mass of the organic group]: 0.347 [compound having a silicon mass ratio of 34.7% by mass]: note that the "organic group" mentioned here refers to a residue obtained by removing from the general formula (B) three groups represented by the formula: —Si(OEt)$_3$) was dissolved in ethanol (0.9 mL) to obtain a mixture solution, followed by addition of 2 M (mol/L) hydrochloric acid (6 µL) in the mixture solution for stirring at room temperature for 24 hours to prepare a sol solution. Next, the obtained sol solution was cast on a silicon substrate to form a thin film of the sol solution on the silicon substrate. Next, a PDMS mold (nanomold) obtained as mentioned earlier was mounted on the thin film of the sol solution so that the textured surface side of the PDMS mold (nanomold) was brought into contact therewith, followed by standing at room temperature for 12 hours. After that, with the PDMS mold (nanomold) mounted, heat treatment was carried out on the thin film of the sol solution at 100° C. for 1 hour to cure the thin film, followed by removal of the PDMS mold (nanomold) to form an organic silica thin film (film thickness: 150 nm). [Evaluation of Characteristics of Organic Silica Thin Film Obtained in Example 4]

The state of the textured structure of the organic silica thin film obtained in Example 4 was measured with an atomic force microscope (AFM). FIG. 9 illustrates the obtained atomic force microscope (AFM) image, and FIG. 10 illustrates the cross-sectional image (vertical cross-sectional view) along the white line in FIG. 9. As is apparent from the AFM image illustrated in FIG. 9, it was revealed that there formed was a regular porous structure on which the structure of the nanomold had been transcribed. In addition, it was revealed from the cross-sectional view illustrated in FIG. 10 that there formed was a nanopillar array structure with a height in a range of 80 to 130 nm on which the structure of the nanomold had been transcribed. Note that such AFM measurement was carried out for several sites by changing the measurement sites. The cross-sectional views obtained by such measurement were used to measure the axis directions of 100 randomly selected textured structures (directions of the longitudinal axes of the column-shaped bodies (bump parts)). It was revealed that all of the axis directions of the textured structures measured were at angles in a range of 90°±20° with respect to the surface opposite to the surface of the organic silica thin film having the textured structure formed therein and that the axis directions of the textured structure were oriented substantially perpendicularly to the surface of the organic silica thin film opposite to the surface thereof having the textured structure formed therein.

In addition, such AFM measurement was carried out for several sites by changing the measurement sites. The measurement results were used to obtain cross-sectional views (vertical cross-sectional views), to measure the distance between the centers (between the top points) of nearest bump parts for 100 randomly selected bump parts, and to obtain the average texture pitch (average pitch of pillars) from the average thereof, and it was revealed that the average texture pitch of the organic silica thin film was 250 nm. Moreover, the cross-sectional views obtained by AFM measurement were used to measure the inter-wall distance (horizontal distance) to the nearest bump part at a position with a height half the average height for 100 randomly selected bump parts, to measure the average thereof, and to measure the average value of the distance between bump part walls (average pillar diameter), and it was revealed that the average value of the distance between bump part walls of the textured structure of the organic silica thin film was 80 nm. In addition, the cross-sectional views obtained by AFM measurement of the organic silica thin film were used to obtain the average bump part height (average value of pillar height) for 100 randomly selected textured structures, and it was revealed that the average value of the height (dent part depth) of the bump part was 105 nm.

In addition, for the purpose of measuring the absorption wavelength of the organic group in the organic silica thin film obtained in Example 4, a sample was formed to measure the ultraviolet/visible absorption spectrum as described below. Specifically, first, a sol solution was prepared in the same manner as that of Example 4. The sol solution was cast on a quartz substrate and allowed to stand at room temperature (25° C.) for 180 minutes to form an uncured organic silica thin film (film thickness: 150 to 250 nm) as a sample. The measurement results of the ultraviolet/visible absorption spectrum of such a sample showed an absorption local maximum wavelength at 311 nm, and it was revealed that the organic group in the organic silica thin film was light absorbable.

What is more, from the type of the raw material compound used, the mass ratio of the silicon to the organic group (light absorbable organic group) constituting the organic silica thin film obtained in Example 4 ([mass of the silicon]/[mass of the organic group]) was clearly 0.347.

Example 5

Laser desorption/ionization mass spectrometry (LDI-MS) was carried out in the same manner as the method employed in Example 3 except that the organic silica thin film obtained in Example 4 was used instead of organic silica thin film obtained in Example 1 and that the concentration of the aqueous solution of angiotensin I was changed. Specifically, an aqueous solution of angiotensin I (concentration of angiotensin I: 1.0 mol/μL, containing 0.1% by mass of trifluoroacetic acid) was coated in an amount of 1 μL on the surface of the organic silica thin film having the textured structure formed therein to allow the organic silica thin film to support a sample (angiotensin I). Then, an MALDI-TOF-MS apparatus (wavelength of the irradiation laser ray: 337 nm) was used for irradiation with a laser ray having a wavelength of 337 nm, thereby carrying out laser desorption/ionization mass spectrometry (LDI-MS). FIG. 11 illustrates a graph of mass spectrum (LDI-MS spectrum) as the results of such analysis.

As is apparent from the mass spectrum (LDI-MS spectrum) illustrated in FIG. 11, such laser desorption/ionization mass spectrometry (LDI-MS) made it possible to clearly detect a peak (signal) of the mass spectrum at the position of m/z=1297. Note that such a peak at the position of m/z=1297 corresponds to angiotensin I. As described above, it was revealed that the laser desorption/ionization mass spectrometric method using the organic silica thin film of the present invention (Example 4) made it possible to clearly detect a signal (m/z=1297) corresponding to angiotensin I without using a matrix.

Comparative Example 1

An organic silica thin film (nonporous) without a textured structure formed therein was obtained in the same manner as that in Example 1 except that a thin film of sol solution was not subjected to the step of pressing a nanomold against the thin film after the formation of the thin film on a silicon substrate, but instead a thin film of sol solution was directly subjected to heating treatment at 80° C. for 72 hours after the formation of the thin film on a silicon substrate, without using the nanomold. Next, laser desorption/ionization mass spectrometry (LDI-MS) was carried out in the same manner as that described in Example except that the organic silica thin film (nonporous) without a textured structure formed therein obtained in this way was used instead of the organic silica thin film obtained in Example 1. FIG. 12 illustrates a graph of mass spectrum (LDI-MS spectrum) as the results of such analysis. As is apparent from the mass spectrum (LDI-MS spectrum) illustrated in FIG. 12, it was revealed that such laser desorption/ionization mass spectrometry (LDI-MS) made it impossible to clearly detect a signal (peak (signal) of the mass spectrum at the position of m/z=1297) corresponding to angiotensin I.

Comparative Example 2

A compound represented by the following general formula (C):

[Chem. 8]

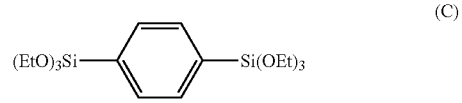

(C)

(in the formula (C), the group represented by Et represents an ethyl group)
(80 mg, ratio of [mass of the silicon]/[mass of the organic group]: 0.737 [compound having a silicon mass ratio of 73.7% by mass]: note that the "organic group" mentioned here refers to a residue obtained by removing from the general formula (C) two groups represented by the formula: —Si(OEt)$_3$) was dissolved in ethanol (1.5 mL) to obtain a mixture solution, followed by addition of 2 M (mol/L) hydrochloric acid (15 μL) in the mixture solution for stirring at room temperature for 2 hours to prepare a sol solution. Next, the obtained sol solution was filtered with a membrane filter, and then the filtered sol solution was spin-coated ([coating condition] employed the condition of continuously increasing the rotation speed from 0 rpm to 1200 rpm over 10 seconds and maintained the rotation at 1200 rpm for 5 seconds) on a silicon substrate to form an organic silica thin film (film thickness: 200 nm) on the silicon substrate.

Next, the same method as the nanoimprinting method employed in Example 1 was employed to press a nanomold (trade name "FleFimo" manufactured by Soken Chemical & Engineering Co., Ltd.) against the thin film formed on the silicon substrate for immobilization. Then, heat treatment was carried out at 80° C. for 72 hours maintaining the pressing state, followed by removal of the nanomold to form an organic silica thin film.

[Evaluation of Characteristics of Organic Silica Thin Film Obtained in Comparative Example 2]

For the purpose of measuring the absorption wavelength of the organic group in the organic silica thin film obtained in Comparative Example 2, a sample was formed to measure the ultraviolet/visible absorption spectrum as described below. Specifically, first, a sol solution was prepared in the same manner as that of Example 1 and filtered with a membrane filter, and the filtered sol solution was used for spin coating ([coating condition] employed the condition of continuously increasing the rotation speed from 0 rpm to 1200 rpm over 10 seconds and maintained the rotation at 1200 rpm for 5 seconds) to form an organic silica thin film (film thickness: 200 nm) as a sample on a quartz substrate. FIG. 13 illustrates the ultraviolet/visible absorption spectrum of such a sample. Note that, as is apparent from the ultraviolet/visible absorption spectrum illustrated in FIG. 13, the organic group in the polymer of the compound (organic silicon compound) represented by the general formula (C) showed absorption local maximum wavelengths at 220 nm, 271 nm, and 277 nm, and it was revealed that the organic group in the organic silica thin film was light absorbable.

Next, the surface state of the organic silica thin film obtained in Comparative Example 2 was measured with an atomic force microscope (AFM). FIG. 14 illustrates the obtained atomic force microscope (AFM) image. As is apparent from the results (AFM image) illustrated in FIG. 14, it was revealed that the organic silica thin film obtained in Comparative Example 2 did not have a nano-textured structure formed therein, and it was revealed that, when an organic silica thin film is produced using the compound represented by the above general formula (C), it is impossible to form a nano-textured structure even in the case of employing the nanoimprinting method. Comparison of the methods for producing an organic silica thin film employed in Example 1 and Comparative Example 2 showed that the types of the organic silicon compounds used were different and that, depending on the mass ratio of silicon to the organic group ([mass of the silicon]/[mass of the organic group]), formation of a textured structure was impossible even in the case of employing the nanoimprinting method. In consideration of these results, the present inventors presume as follows. In Comparative Example 2, a high content of silicon caused rapid progress of curing reaction immediately after the film formation, making it impossible for the nanopillar structure of the mold to intrude into the film even when heated with the mold pressed. The organic silica thin film obtained after heating was a completely cured nonporous film, making it impossible to form a textured structure on the surface.

INDUSTRIAL APPLICABILITY

As described above, the present invention makes it possible to provide an organic silica thin film which can be suitably used as an analysis substrate for laser desorption/ionization (LDI) and which can be produced more efficiently by a simpler method, a method for producing the organic silica thin film, a laser desorption/ionization mass spectrometric substrate using the organic silica thin film, and a laser desorption/ionization mass spectrometric method using the organic silica thin film.

Such an organic silica thin film of the present invention can have a textured structure suitable in an analysis substrate for laser desorption/ionization (LDI), and thus is useful as, for example, a laser desorption/ionization mass spectrometric substrate.

REFERENCE SIGNS LIST

1: substrate
2: organic silica thin film
$S_1$: surface on the side where the textured structure of the organic silica thin film is formed
$S_2$: surface opposite to the surface $S_1$ (surface on the side where the textured structure is not formed)
T: thickness of the organic silica thin film
C: longitudinal axis of the pore spatial shape (gap column shape)
α: angle formed by the surface $S_2$ and the longitudinal axis C of the pore spatial shape

The invention claimed is:

1. An organic silica thin film comprising:
organic silica having a light absorbable organic group in a skeleton, wherein
the organic group has a local maximum absorption wavelength in a wavelength range of 200 to 1200 nm,
a content ratio of silicon and the organic group which constitute the organic silica is in a range of 0.05 to 0.50 based on a ratio of a mass of the silicon to a mass of the organic group ([mass of the silicon]/[mass of the organic group]),
the thin film has a textured structure, and
an axis direction of the textured structure is a direction substantially perpendicular to a surface opposite of the organic silica thin film to a surface thereof having the textured structure formed therein.

2. The organic silica thin film according to claim 1, wherein
the organic group has a local maximum absorption wavelength in a wavelength range of 200 to 600 nm.

3. The organic silica thin film according to claim 1, wherein
the organic silica thin film is a porous film having a textured structure in which dent parts are formed of column-shaped pores or a thin film having a textured structure formed of a pillar array in which bump parts are formed of column-shaped bodies and the column-shaped bodies are arranged.

4. A laser desorption/ionization mass spectrometric substrate used for a laser desorption/ionization mass spectrometric method, the substrate comprising the organic silica thin film according to claim 1.

5. A laser desorption/ionization mass spectrometric method comprising the step of:
carrying out mass spectrometry by
using a substrate comprising the organic silica thin film according to claim 1,
allowing the organic silica thin film to support a sample containing measurement target molecules, and
irradiating a sample supporting portion of the film with a laser ray to ionize the measurement target molecules.

6. The organic silica thin film according to claim 1, wherein
an average texture pitch of the textured structure is 20 to 1000 nm.

7. The organic silica thin film according to claim 1, wherein
an average bump part height of the textured structure is 20 to 1500 nm.

8. A method for producing an organic silica thin film, comprising the step of:
obtaining the organic silica thin film according to claim 1, by forming a textured structure by nanoimprinting in a film obtained from a sol solution obtained by partially polymerizing an organic silicon compound having a light absorbable organic group, followed by curing, wherein
the organic silicon compound is an organic silicon compound which has an organic group having a local maximum absorption wavelength in a wavelength range of 200 to 1200 nm as a light absorbable organic group and in which a content ratio of silicon and the organic group is in a range of 0.05 to 0.50 based on a ratio of a mass of the silicon to a mass of the organic group ([mass of the silicon]/[mass of the organic group]).

9. The method for producing an organic silica thin film according to claim 8, wherein
the organic silica thin film is a porous film having a textured structure in which dent parts are formed of column-shaped pores or a thin film having a textured structure formed of a pillar array in which bump parts are formed of column-shaped bodies and the column-shaped bodies are arranged.

10. The method for producing an organic silica thin film according to claim 8, wherein
the film obtained from the sol solution is a uncured film or a semi-cured film.

11. The method for producing an organic silica thin film according to claim 8, wherein
the step of obtaining an organic silica thin film comprises:
mounting a mold on a surface of the film obtained from the sol solution so as to transcribe characteristics of a texture formed in the mold, and heating the film obtained from the sol solution for curing with the mold mounted thereon.

12. The method for producing an organic silica thin film according to claim 8, wherein
the organic silica thin film has a textured structure in which an average texture pitch is 20 to 1000 nm.

13. The method for producing an organic silica thin film according to claim 8, wherein
the organic silica thin film has a textured structure in which an average bump part height is 20 to 1500 nm.

* * * * *